United States Patent
Takei

(10) Patent No.: US 10,749,273 B2
(45) Date of Patent: Aug. 18, 2020

(54) WIRELESS COMMUNICATION SYSTEM AND WIRELESS SURVEILLANCE CONTROL SYSTEM

(71) Applicant: Hitachi, Ltd., Chiyoda-ku, Tokyo (JP)

(72) Inventor: Ken Takei, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 77 days.

(21) Appl. No.: 16/206,400

(22) Filed: Nov. 30, 2018

(65) Prior Publication Data

US 2019/0173199 A1 Jun. 6, 2019

(30) Foreign Application Priority Data

Dec. 4, 2017 (JP) .................................. 2017-232541

(51) Int. Cl.
| | |
|---|---|
| *H04B 7/02* | (2018.01) |
| *H01Q 21/24* | (2006.01) |
| *H01P 1/17* | (2006.01) |
| *H01Q 15/24* | (2006.01) |
| *H04B 7/0456* | (2017.01) |
| *H04B 7/08* | (2006.01) |
| *H04B 7/10* | (2017.01) |

(52) U.S. Cl.
CPC ............ *H01Q 21/245* (2013.01); *H01P 1/17* (2013.01); *H01Q 15/246* (2013.01); *H04B 7/0469* (2013.01); *H04B 7/0851* (2013.01); *H04B 7/10* (2013.01)

(58) Field of Classification Search
None
See application file for complete search history.

(56) References Cited

U.S. PATENT DOCUMENTS

| | | | |
|---|---|---|---|
| 2014/0112409 A1* | 4/2014 | Takei | ................... H04B 1/0483 375/278 |
| 2016/0255499 A1* | 9/2016 | Takei | ....................... H04K 1/08 455/410 |
| 2017/0310379 A1 | 10/2017 | Takei | |

FOREIGN PATENT DOCUMENTS

JP    2010-278974 A    12/2010

OTHER PUBLICATIONS

Extended European Search Report issued in counterpart European Application No. 18207272.8 dated May 16, 2019 (12 pages).

* cited by examiner

*Primary Examiner* — Adolf Dsouza
(74) *Attorney, Agent, or Firm* — Crowell & Moring LLP

(57) ABSTRACT

A wireless communication system that communicates by an electromagnetic wave includes a first wireless device that includes a transmission rotationally polarized wave frequency generator for giving a rotation period to a polarized wave of the electromagnetic wave to be transmitted, transmits a synchronization code by the electromagnetic wave of the polarized wave rotated using the transmission rotationally polarized wave frequency generator, and transmits data by the electromagnetic wave, and a second wireless device that includes a reception rotationally polarized wave frequency generator for giving a rotation period to the polarized wave received in a reception of the electromagnetic wave, calculates transmission timing of the synchronization code included in the received electromagnetic wave of the polarized wave rotated using the reception rotationally polarized wave frequency generator, and sets a signal included in the received electromagnetic wave, as data based on the calculated transmission timing.

15 Claims, 25 Drawing Sheets

WIRELESS COMMUNICATION SYSTEM AND WIRELESS SURVEILLANCE CONTROL SYSTEM

BACKGROUND OF THE INVENTION

1. Field of the Invention

The present invention relates to a wireless communication system and a wireless surveillance control system.

2. Description of Related Art

A concept receiving attention is about Internet of Things (IoT) that collects a signal relating to a state of a large number of devices through the Internet, distributes a signal controlling a large number of devices based on a content of the collected signal, and realizes highly efficient operation of various systems including a large number of devices, and various technological developments are intensively advanced for realizing the IoT.

For realizing the IoT, it is necessary to couple a sensor that surveils information of a device and an actuator that controls an operation of the device to the Internet. Since there are a large number of sensors and actuators for a plurality of devices constituting the system, coupling by wireless communication for which a cable that is a physical coupling means is unnecessary is preferable from a viewpoint of elimination of constraints on an operation state of the device and cost reduction of the installation of hardware related to the coupling.

Since electric power is transmitted by a polarized wave generated in a direction perpendicular to a propagation direction of an electromagnetic wave, when a large number of sensors and actuators are fixedly installed in a large number of devices, the electromagnetic wave is reflected by the devices surrounding the propagation of the electromagnetic wave, a polarized wave is shifted, and the polarized wave in various directions reaches an access point with the Internet.

On the other hand, in the sensors and actuators, since it is difficult to increase transmission power due to a limitation of power consumption of a wireless circuit, there is a possibility that degradation in communication quality due to a deviation between the reached polarized wave and the polarized wave suitable for reception becomes apparent, and there is a possibility that an error occurs in information transmitted by wireless communication.

Regarding the error of the information in the wireless communication, in the related art described in JP-A-2010-278974, a wireless device includes a plurality of error correction circuits, a receiver of the wireless device monitors signal quality and detects a change in the signal quality, and a plurality of error correction circuits are switched and used.

In the related art described in JP-A-2010-278974, a possibility of correcting the error of the information in the wireless communication increases. However, in the related art described in JP-A-2010-278974, there is a limit in recovering degradation of the received signal quality or recovering the error of the information because it is impossible to acquire a reduction of received signal intensity itself due to deviation between the polarized waves.

In such a circumstance, an object of the present invention is to provide a wireless communication system that prevents degradation of received signal quality even in a wireless environment in which a polarized wave of an electromagnetic wave is shifted.

SUMMARY OF THE INVENTION

The present invention includes a plurality of means for solving the above-mentioned problems, but as an example thereof, a wireless communication system that communicates by an electromagnetic wave includes a first wireless device that includes a transmission rotationally polarized wave frequency generator for giving a rotation period to a polarized wave of the electromagnetic wave to be transmitted, transmits a synchronization code by the electromagnetic wave of the polarized wave rotated using the transmission rotationally polarized wave frequency generator, and transmits data by the electromagnetic wave of the polarized wave rotated using the transmission rotationally polarized wave frequency generator, and a second wireless device that includes a reception rotationally polarized wave frequency generator for giving a rotation period to the polarized wave received in a reception of the electromagnetic wave, calculates transmission timing of the synchronization code included in the received electromagnetic wave of the polarized wave rotated using the reception rotationally polarized wave frequency generator, and sets a signal included in the received electromagnetic wave of the polarized wave rotated using the reception rotationally polarized wave frequency generator, as data based on the calculated transmission timing.

According to the present invention, it is possible to provide a wireless communication system that prevents degradation of received signal quality even in a wireless environment in which a polarized wave of an electromagnetic wave are shifted.

DESCRIPTION OF EMBODIMENTS

Hereinafter, each embodiment will be described with reference to the drawings.

Embodiment 1

In the present embodiment, an example of an operation of a wireless system (a wireless communication system) that prevents degradation of received signal quality regarding wireless environment change will be described with reference to FIGS. 1, 15A, 15B, 16A, 16B, 20A, 20C, and 21.

Figure 1:
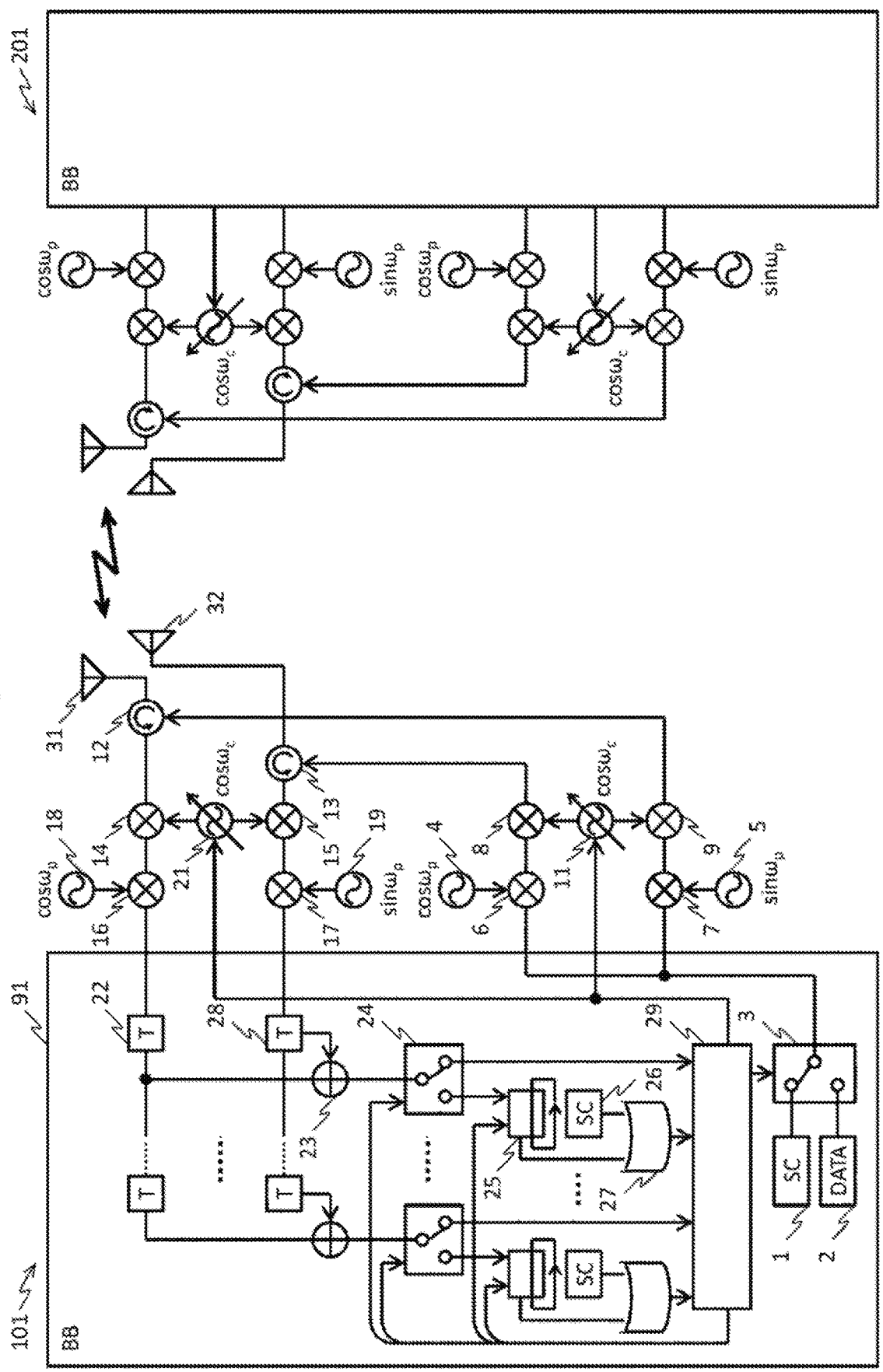
FIG. 1 is a diagram illustrating an example of a wireless system in Embodiment 1.

FIG. 1 is a diagram illustrating an example of the wireless system. The example of the wireless system illustrated in FIG. 1 includes a pair of a wireless device 101 and a wireless device 201, and since the configurations of the wireless device 101 and the wireless device 201 are the same, the wireless device 101 will be described and a description of the wireless device 201 will be omitted.

A synchronization code generator 1 and a data string generator 2 are respectively coupled to two inputs of a transmission changeover switch 3, an output of the transmission changeover switch 3 is branched into two, one is coupled to an input of a first rotationally polarized wave transmission mixer 6, and an output of a transmission rotationally polarized wave frequency cosine wave generator 4 is coupled to a local input of the first rotationally polarized wave transmission mixer 6.

An output of the first rotationally polarized wave transmission mixer 6 is coupled to an input of the first carrier transmission mixer 8, an output of a transmission carrier variable frequency generator 11 is coupled to a local input of the first carrier transmission mixer 8, and an output of the first carrier transmission mixer 8 is coupled to a third terminal of a second circulator 13.

The other of the two branches of the output of the transmission changeover switch 3 is coupled to an input of a second rotationally polarized wave transmission mixer 7, a transmission rotationally polarized wave frequency sine wave generator 5 is coupled to a local input of the second rotationally polarized wave transmission mixer 7, and an output of the second rotationally polarized wave transmission mixer 7 is coupled to an input of a second carrier transmission mixer 9.

An output of the transmit carrier variable frequency generator 11 is coupled to a local input of the second carrier transmission mixer 9 and an output of the second carrier transmission mixer 9 is coupled to a third terminal of a first circulator 12.

A first antenna 31 is coupled to a first terminal of the first circulator 12, an input of a first carrier reception mixer 14 is coupled to a second terminal of the first circulator 12, an output of a reception carrier variable frequency generator 21 is coupled a local input of the first carrier reception mixer 14, and an output of the first carrier reception mixer 14 is coupled to an input of a first rotationally polarized wave reception mixer 16.

An output of a reception rotationally polarized wave frequency cosine wave generator 18 is coupled to a local input of the first rotationally polarized wave reception mixer 16, an output of the first rotationally polarized wave reception mixer 16 is coupled to an input of an initial stage of a plurality of first delay circuits 22 that are serially connected to each other, and outputs that are sequentially time-delayed by the plurality of first delay circuits 22 are input to first inputs of a plurality of synthesis circuits 23, respectively.

A second antenna 32 is coupled to a first terminal of the second circulator 13, an input of a second carrier reception mixer 15 is coupled to a second terminal of the second circulator 13, the output of the reception carrier variable frequency generator 21 is coupled a local input of the second carrier reception mixer 15, and an output of the second carrier reception mixer 15 is coupled to an input of a second rotationally polarized wave reception mixer 17.

An output of a reception rotationally polarized wave frequency sine wave generator 19 is coupled to a local input of the second rotationally polarized wave reception mixer 17, an output of the second rotationally polarized wave reception mixer 17 is coupled to an input of an initial stage of a plurality of second delay circuits 28 that are serially connected to each other, and outputs that are sequentially time-delayed by the plurality of second delay circuits 28 are input to second inputs of the plurality of synthesis circuits 23, respectively.

Note that, In FIG. 1, the outputs from the plurality of second delay circuits 28 that are serially connected to each other to the second delay circuit 28 of a next stage and the outputs to the synthesis circuit 23 are expressed by different lines, but this is an expression on the drawing, and the output to the second delay circuit 28 of the next stage and the output to the synthesis circuit 23 are the outputs of the same signal. The same expressions are used in the following drawings.

Outputs of the plurality of synthesis circuits 23 are respectively input to common inputs of a plurality of reception changeover switches 24, a first output of the reception changeover switch 24 is coupled to an input of a sliding correlation device 25, an output of the sliding correlation device 25 and an output of a synchronization code generator 26 are compared with each other by a comparator 27, an output of the comparator 27 is input to an arithmetic unit 29, and a second output of the reception changeover switch 24 is directly input to the arithmetic unit 29.

The synchronization code generator 1, the data string generator 2, the transmission changeover switch 3, the first delay circuit 22, the second delay circuit 28, the synthesis circuit 23, the reception changeover switch 24, the sliding correlation device 25, the synchronization code generator 26, the comparator 27, and the arithmetic unit 29 are included in a digital signal processing circuit 91. The digital signal processing circuit 91 may be a baseband circuit. The first antenna 31 and the second antenna 32 may be provided outside the wireless device 101 or inside the wireless device 101.

Figure 15A:
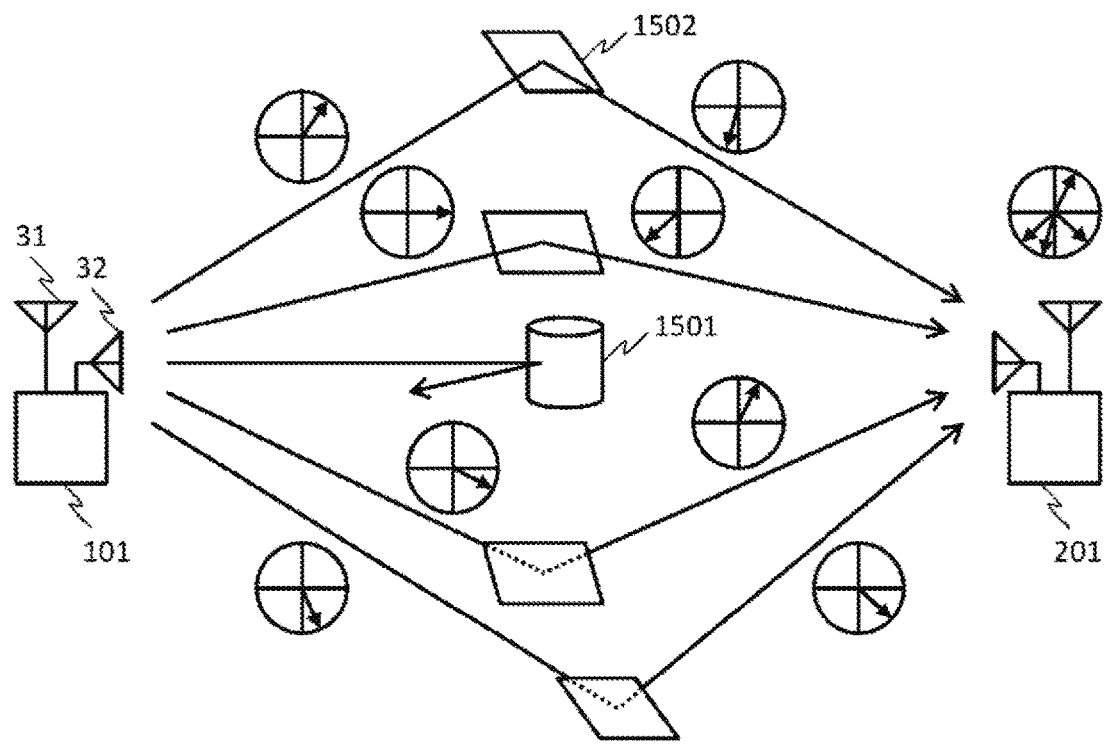
FIG. 15A is a diagram illustrating an example of a wireless environment in Embodiments 1 to 10.

FIG. 15A is a diagram illustrating an example of a wireless environment in which the wireless system of the present embodiment is placed. The wireless device 101 described with reference to FIG. 1 radiates electromagnetic waves multiplied by a cosine wave and a sine wave of a rotationally polarized wave frequency to space from the first antenna 31 and the second antenna 32 that are spatially orthogonal, respectively.

Figure 15B:
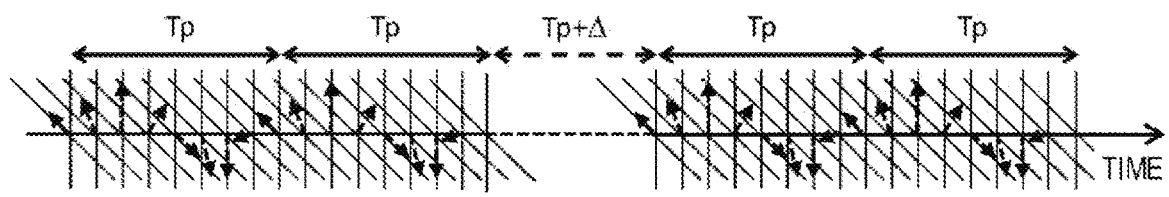
FIG. 15B is a diagram illustrating an example of a rotationally polarized wave in Embodiments 1 to 10.

Therefore, as illustrated in FIG. 15B, a rotationally polarized wave, that is a polarized wave rotated at a right angle to a traveling direction (time), is formed in space and propagates from the wireless device 101 to the wireless device 201. In FIG. 15B, Tp is one period of the rotationally polarized wave.

As illustrated in FIG. 15A, since there are a device 1501 (cylinder) that interrupts a direct wave and a plurality of reflection surfaces 1502 (plates) that reflect the rotationally polarized wave to generate a reflected wave between the wireless device 101 that is a transmitter and the wireless device 201 that is a receiver, the electromagnetic wave radiated from the wireless device 101 (transmitter) reach the wireless device 201 (receiver) through a propagation path of a plurality of reflected waves according to Snell's reflection law.

Since a normal vector of the reflection surface and an incident angle of the electromagnetic wave are generally different in each propagation path, the polarized wave shifts of the electromagnetic waves reaching the receiver through the different propagation paths are different. Since the electromagnetic wave is a vector wave, a plurality of incoming electromagnetic waves are synthesized by a vector product at a reception point and received as one vector amount, and reception electric field strength becomes greatest by the polarized wave in a direction coincident with a direction of the synthesized vector.

As illustrated in FIG. 15B, since the wireless device 101 (transmitter) transmits signals using polarized waves of a plurality of (in the example of FIG. 15B, eight) angles in one period of the rotationally polarized wave, the received signal strength becomes greatest at a specific time of one period, and that time is repeated every period of the rotationally polarized wave.

However, since the wireless environment surrounding the wireless system changes, a reflection condition of the electromagnetic wave and a shielding condition change, such that a point at which the received signal strength of the wireless device 201 (receiver) becomes greatest changes, but it is possible to detect the change by obtaining information on the angle of the polarized wave using the wireless device 101 (transmitter).

The wireless devices 101 and 201 illustrated in FIG. 1 use a code including a frequency component higher than a frequency of the rotationally polarized wave to detect each time within one period of the rotationally polarized wave. It is possible to specify the time within one period of the rotationally polarized wave by Nyquist theorem with a time interval of a period corresponding to half of a maximum frequency of the code.

Figure 16A:
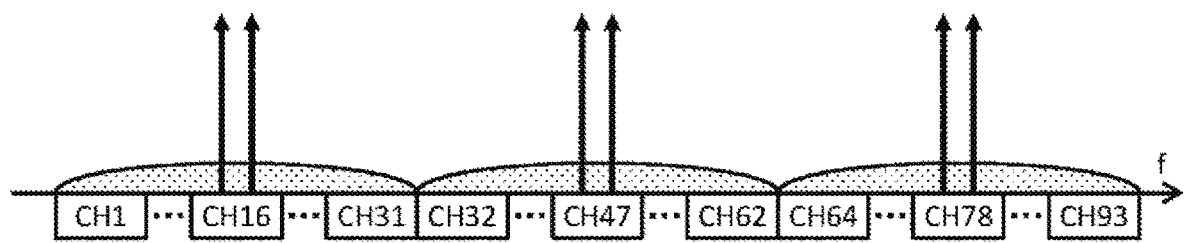
FIG. 16A is a diagram illustrating an example of a frequency band of a synchronization code in Embodiments 1 to 4.
Figure 16B:
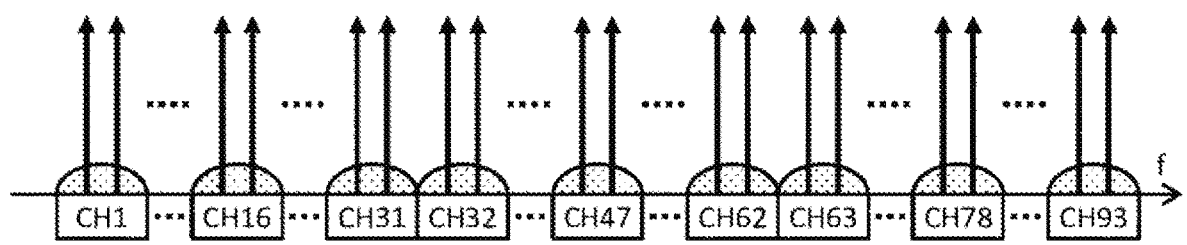
FIG. 16B is a diagram illustrating an example of a frequency band of a data string in Embodiments 1 to 4.

FIGS. 16A and 16B are diagrams illustrating examples of frequency bands used by the wireless system of the present embodiment, and in this example, the wireless system uses a communication frequency band, that is, 93 channels. The wireless device 101 (transmitter) transmits a code (synchronization code) including a frequency sufficiently higher than a frequency of the rotationally polarized wave so that the wireless device 201 (receiver) detects the polarized wave used by the wireless device 101 (transmitter).

In the rotationally polarized wave communication, for the wireless device 201 (receiver) to find a time at which the received signal strength becomes greatest among a plurality of polarized waves used by the wireless device 101 (transmitter) within one period of the rotationally polarized wave (to receive at the time at which the received signal strength becomes greatest), the signal (data) to be transmitted need to not change within one period of the rotationally polarized wave, therefore a frequency of a signal to be transmitted needs to be sufficiently lower than the frequency of the rotationally polarized wave.

Therefore, a frequency band required when the wireless device 101 (transmitter) and the wireless device 201 (receiver) transmit the code for polarized wave synchronization is further sufficiently wider than a frequency band required when an information signal is transmitted.

In the examples of FIGS. 16A and 16B, one channel is used for transmission of one information signal as illustrated in FIG. 16B. On the other hand, 31 channels are used such that a wide frequency band is required for transmission of one polarized wave synchronization as illustrated in FIG. 16A. Therefore, in 93 channels, the number of polarized wave synchronization is smaller than the number of the information signals.

Which channel is used in each of the information signal and the polarized wave synchronization is selected by changing frequencies of the transmission carrier variable frequency generator 11 and the reception carrier variable frequency generator 21 based on a control of the arithmetic unit 29.

A communication procedure of the wireless system of the present embodiment will be described with reference to FIG.

21. First, the wireless device 101 (transmitter) selects the output of the synchronization code generator 1 with the transmission changeover switch 3 (step 2101). The synchronization code output from the synchronization code generator 1 is branched into two, an output of the transmission rotationally polarized wave frequency cosine wave generator 4 and an output of the transmission rotationally polarized wave frequency sine wave generator 5 are multiplied to the two, respectively, and a quadrature modulation of the rotationally polarized wave frequency is implemented.

Signals of the two synchronization codes on which the quadrature modulation is implemented are up-converted to a carrier frequency band by the transmission carrier variable frequency generator 11 and radiated as the electromagnetic wave to space from the spatially orthogonal first antenna 31 and second antenna 32 (step 2102).

The wireless device 201 (receiver) of the same configuration as the wireless device 101 receives the signals from the wireless device 101 with the spatially orthogonal first antenna 31 and second antenna 32 (step 2104), and the signals are down-converted by the reception carrier variable frequency generator 21. Note that the detection of the synchronization code (step 2103) will be described later. An operation of a circuit in the wireless device 201 will be described using reference numerals of the wireless device 101 of the same configuration for the sake of convenience.

Since two signals after the down-conversion are orthogonal signals of the rotationally polarized wave frequency, the two signals are orthogonally demodulated by the reception rotationally polarized wave frequency cosine wave generator 18 and the reception rotationally polarized wave frequency sine wave generator 19, respectively, and generates two orthogonal signals respectively corresponding to divided domains by the first delay circuit 22 and the second delay circuit 28 corresponding to time domains obtained by dividing the period of the rotationally polarized wave.

A code transmitted with different polarized waves used by the wireless device 101 in one period of the rotationally polarized wave is able to be obtained by synthesizing both of the generated two orthogonal signals by the synthesis circuit 23. To receive bits corresponding to one period of the code transmitted by the wireless device 101, a delay amount of the first delay circuit 22 and a delay amount of the second delay circuit 28 is equal to or less than a period corresponding to a maximum frequency of the signal generated by the synchronization code generator 1.

The arithmetic unit 29 sets the output of the reception changeover switch 24 to the input of the sliding correlation device 25 to correspond to the selection of the synchronization code generator 1 by the transmission changeover switch 3. Note that, when the synchronization code is detected in step 2103 as will be described later, the arithmetic unit 29 may set the output of the reception changeover switch 24 to the input of the sliding correlation device 25.

Therefore, each bit of the synchronization code transmitted by the wireless device 101 is sequentially input to the plurality of sliding correlation devices 25 and is compared with the output of the synchronization code generator that generates a replica of the synchronization code generated by the synchronization code generator 1 of the wireless device 101 by the comparator 27 by bit (step 2105).

The comparator 27 transmits a comparison result to the arithmetic unit 29, and the arithmetic unit 29 sequentially changes a sliding value of the plurality of sliding correlation devices 25 to extract a synchronization timing of the synchronization code transmitted by the wireless device 101, and specifies the polarized wave used for transmission by the wireless device 101 from the extracted synchronization timing (step 2106).

Figure 20A:
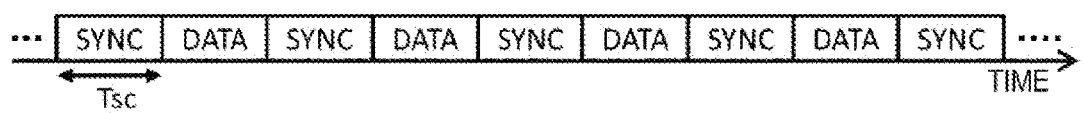
FIG. 20A is a diagram illustrating an example of a sequence of the synchronization code and the data string in Embodiments 1 and 3 to 6.
Figure 20B:
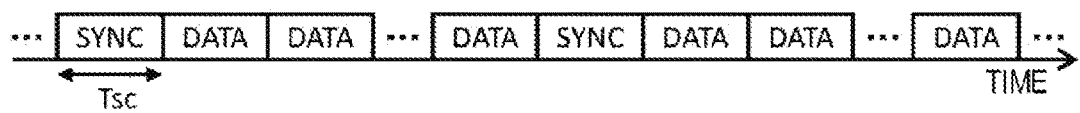
FIG. 20B is a diagram illustrating an example of the sequence of the synchronization code and the data string in Embodiment 2.
Figure 20C:
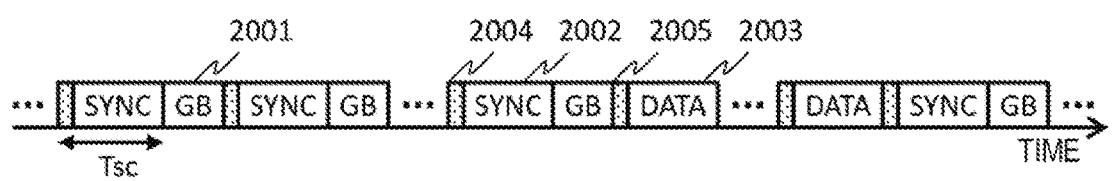
FIG. 20C is a diagram illustrating an example of the sequence of the synchronization code and the data string in Embodiments 1 and 3 to 6.

FIGS. 20A and 20C are diagrams illustrating examples of timings for transmitting the synchronization code and a data string. The above-described series of processes using the sliding correlation devices 25 requires time of one period of the rotationally polarized wave at minimum. When a wireless environment between the wireless device 101 and the wireless device 201 is unstable, the extraction of the synchronization code may not be completed in one period of the rotationally polarized wave.

Therefore, as illustrated in FIG. 20C, time corresponding to multiples of a period of the synchronization code (Tsc) is required, and furthermore, a time margin for a sliding correlation calculation called a guard band 2001 (GB) may be added before and after time corresponding to one period of the synchronization code.

Since the wireless device 201 of the present embodiment needs to determine whether the wireless device 101 is transmitting the synchronization code or the data string, each of the synchronization code generator 1 and the data string generator 2 of the wireless device 101 (transmitter) may add and output special identification bit strings 2004 and 2005 before a synchronization code 2002 and a data string 2003.

To reduce an influence of the sliding correlation device 25, it is preferable that the identification bit strings 2004 and 2005 are continuous codes or short period codes. Therefore, even when the reception changeover switch 24 selects any output, since the arithmetic unit 29 is able to acquire the identification bit string 2004 and 2005, the wireless device 201 determines whether the wireless device 101 is transmitting the synchronization code 2002 (step 2103) or the data string 2003.

After the polarized wave synchronization between the wireless device 201 and the wireless device 101 is performed, the arithmetic unit 29 of the wireless device 201 switches so that the output of the reception changeover switch 24 is directly input to the arithmetic unit 29. Note that, after switching so that the output of the reception changeover switch 24 is directly input to the arithmetic unit 29, the arithmetic unit 29 may detect the identification bit string 2005 (step 2109).

On the other hand, after the wireless device 101 finishes transmission of the synchronization code, the transmission changeover switch 3 changes the selection so as to select the output of the data string generator 2 (step 2107), and transmits the data string by the rotationally polarized wave in the same procedure as the transmission of the synchronization code (step 2108). The wireless device 201 polarized-wave-synchronized with the wireless device 101 receives the data string for each polarized wave used by the wireless device 101 (step 2110).

Figure 21:
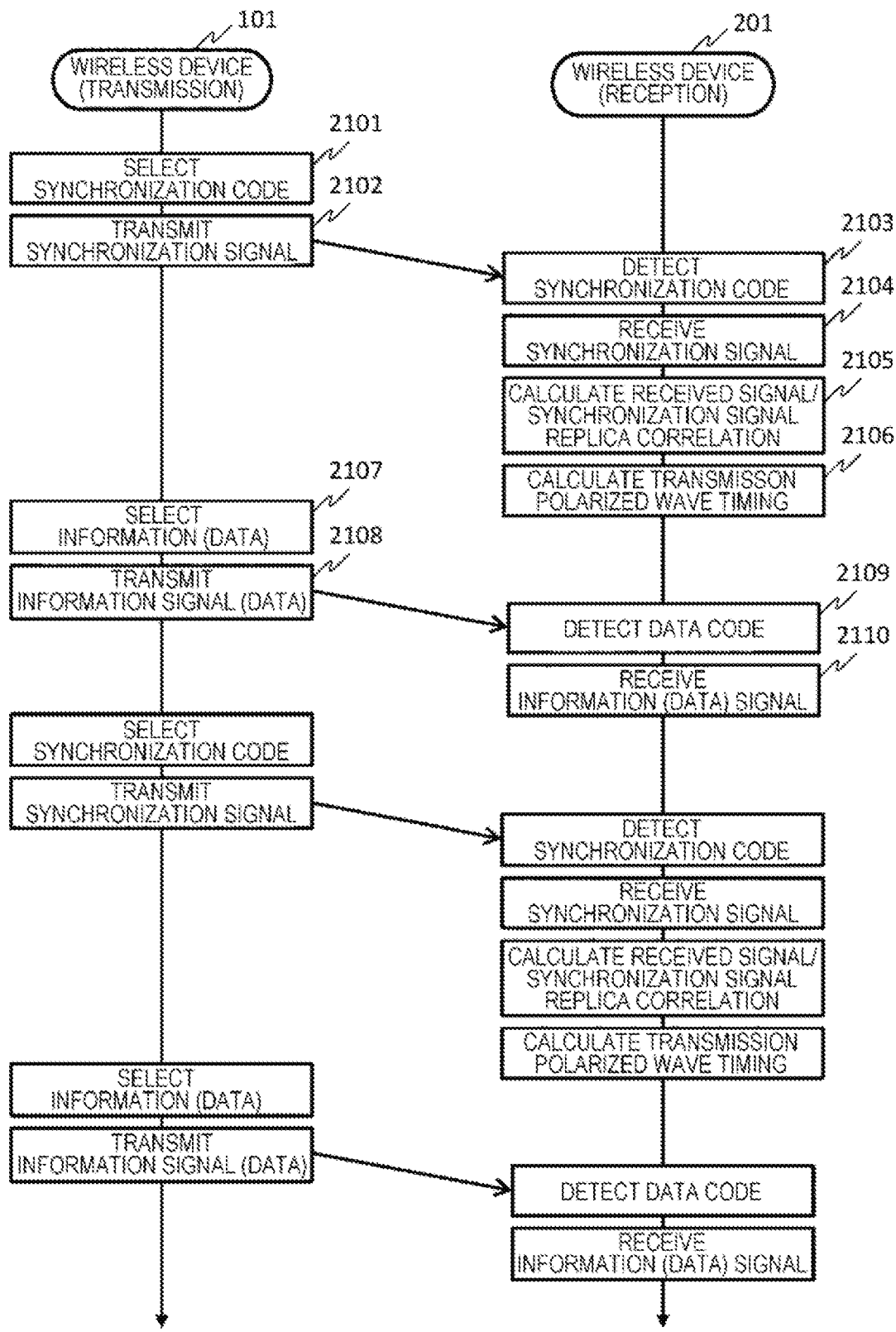
FIG. 21 is a diagram illustrating an example of a communication procedure of the wireless system in Embodiments 1 to 10.

After the polarized wave synchronization between the wireless device 201 and the wireless device 101 is performed, since time for detecting the synchronization signal using sliding correlation is greatly reduced, the synchronization signal and the data string are alternately transmitted as illustrated in FIG. 20A. Then, a series of communication procedures from step 2101 to step 2110 described with reference to FIG. 21 are repeated.

According to the present embodiment, the wireless device 101 (transmitter) is able to transmit the data string using the rotationally polarized wave, and the wireless device 201 (receiver) is able to reconstruct the data string from a received signal by identifying the polarized wave used by the wireless device 101. Therefore, since a signal is able to be wirelessly transmitted by an optimum transmission/reception polarized wave with maximum received signal strength, it is possible to realize high quality wireless communication and to prevent deterioration of wireless quality generated when the wireless environment surrounding the wireless device 101 and the wireless device 201 changes.

Embodiment 2

Figure 2:
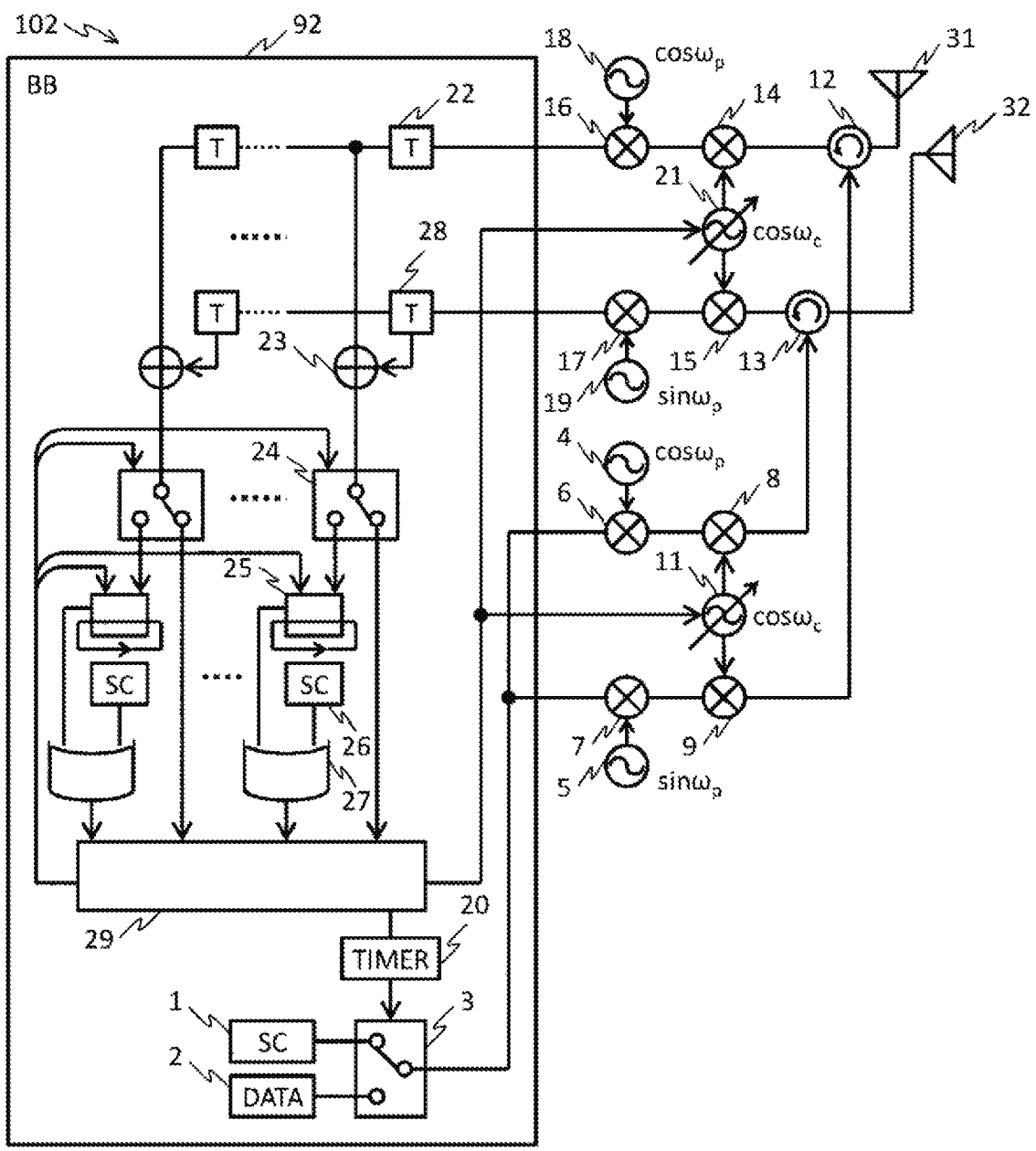
FIG. 2 is a diagram illustrating an example of a wireless device in Embodiment 2.

In the present embodiment, an example in which a data transmission amount is improved compared to Embodiment 1 will be described with reference to FIGS. 2 and 20B. FIG. 2 is a diagram illustrating an example of a wireless device 102 of the present embodiment. The wireless device 102 is a wireless device corresponding to the wireless devices 101 and 201 of the wireless system described with reference to FIG. 1, the same circuit as that in FIG. 1 is denoted by the same reference numeral as that in FIG. 1, and a description thereof will be omitted.

The wireless device 102 illustrated in FIG. 2 is different from the wireless device 101 illustrated in FIG. 1 in that a timer 20 controlled by the arithmetic unit 29 is coupled to the transmission changeover switch 3. When a period is set by the arithmetic unit 29, the timer 20 controls the transmission changeover switch 3 so that switching timing of the transmission changeover switch 3 corresponds to the set period.

When the wireless environment surrounding the wireless system does not change greatly, it is highly possible that once-performed polarized wave synchronization is maintained for a certain period of time. When the wireless environment does not change greatly, as illustrated in FIG. 20B, the data string transmission is performed a plurality of times and thereafter the polarized wave synchronization between the transmitter and the receiver is performed, and thus it is possible to improve the data transmission amount of the wireless system.

Therefore, when the arithmetic unit 29 detects setting from outside of the wireless device 102, the arithmetic unit may set the information on the period in which the transmission changeover switch 3 selects the data string generator 2 for a time longer than the synchronization code generator 1 to the timer 20.

According to the present embodiment, when the change in the wireless environment surrounding the wireless system is small, since it is possible to not only realize the improve of the data transmission capacity but also reduce a calculation amount of the arithmetic unit 29, there are effects that power consumption of the wireless device is reduced and operation cost of the wireless system is reduced.

Embodiment 3

Figure 3:
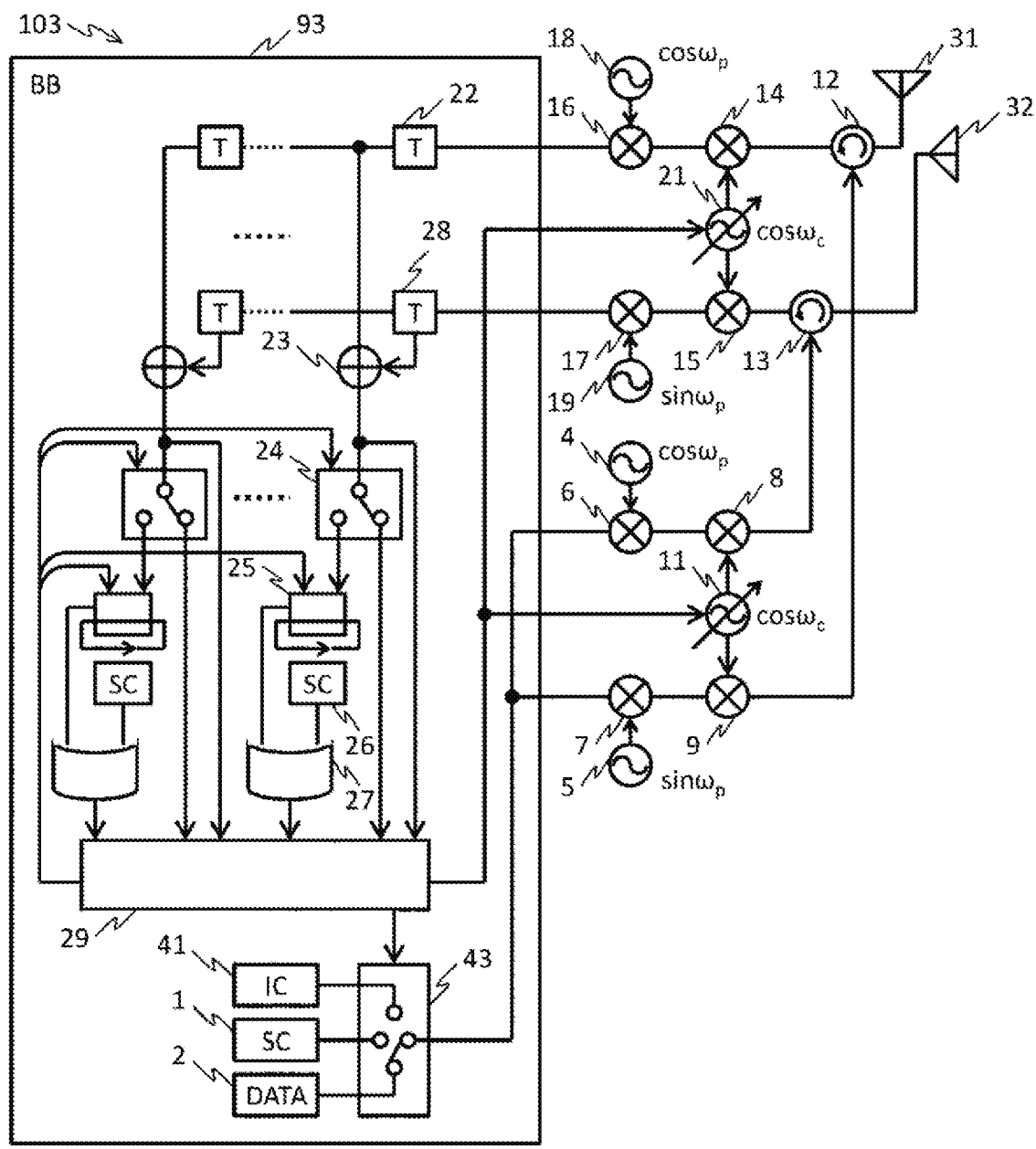
FIG. 3 is a diagram illustrating an example of the wireless device in Embodiment 3.

In the present embodiment, another example in which switching between the transmission of the synchronization code and the transmission of the data string is controlled will be described with reference to FIG. 3 compared to Embodiment 1 and 2. FIG. 3 is a diagram illustrating an example of a wireless device 103 of the present embodiment. The wireless device 103 is a wireless device corresponding to the wireless devices 101 and 201 of the wireless system described with reference to FIG. 1, the same circuit as that in FIG. 1 is denoted by the same reference numeral as that in FIG. 1, and a description thereof will be omitted.

The wireless device 103 illustrated in FIG. 3 is different from the wireless device 101 illustrated in FIG. 1 in that the wireless device 103 includes a mode switching signal generator 41, the wireless device 103 includes a transmission three changeover switch 43 instead of the transmission changeover switch 3, and the transmission three changeover switch 43 switches one of the outputs of the synchronization code generator 1, the data string generator 2, or the mode switching signal generator 41 by an instruction of the arithmetic unit 29.

Another difference is that the output of the synthesis circuit 23 is branched into two, one is coupled to the input of the reception changeover switch 24, and the other is directly input to the arithmetic unit 29. Therefore, the arithmetic unit 29 inputs the output of the synthesis circuit 23 in addition to the output of the comparator 27 when the synchronization code is received and the output of the reception changeover switch 24 when the data string is received.

The wireless device 103 of the present embodiment forcibly switches between a mode for transmitting the synchronization code and a mode for transmitting the data string at arbitrary timing by transmitting a mode switching signal output from the mode switching signal generator 41.

When switching selection between the synchronization code generator 1 and the data string generator 2, the arithmetic unit 29 of the wireless device 103 (transmitter) may control the transmission three changeover switch 43 to select the mode switch signal generator 41, and the mode switching signal may be transmitted from the first antenna 31 and the second antenna 32.

The arithmetic unit 29 of the wireless device 103 (receiver) surveils the output of the synthesis circuit 23, and when detecting output of the mode switching signal received by the first antenna 31 and the second antenna 32 through the synthesis circuit 23, the arithmetic unit 29 may perform control so that the selection of the reception changeover switch 24 is switched.

In the wireless system using the wireless device 103 of the present embodiment, when the wireless environment surrounding the wireless system changes and the polarized wave synchronization cannot be performed, the mode switching signal is not transmitted so that the mode of the polarized wave synchronization is further repeated, that is, the mode for transmitting the synchronization code continues. Alternatively, the mode switching signal is transmitted so as to frequently switch from the mode for transmitting the data string to the mode for transmitting the synchronization code. Therefore, it is possible to prevent data string transmission in a state in which the polarized wave synchronization is not performed.

One factor that causes the wireless environment surrounding the wireless system to change is an invasion into the wireless environment from outside. In such a circumstance, it is important to avoid data leakage to a supposed external person, by holding on the transmission of the data string.

According to the present embodiment, only in a situation in which the polarized wave synchronization is performed and the mode for performing the polarized wave synchronization is set as a normal initial state, that is, the wireless environment surrounding the wireless system is static and an unexpected external intruder is not assumed, wireless communication for transmitting the data string is able to be performed. Therefore, it is possible to realize a highly secure wireless system.

Embodiment 4

Figure 4:
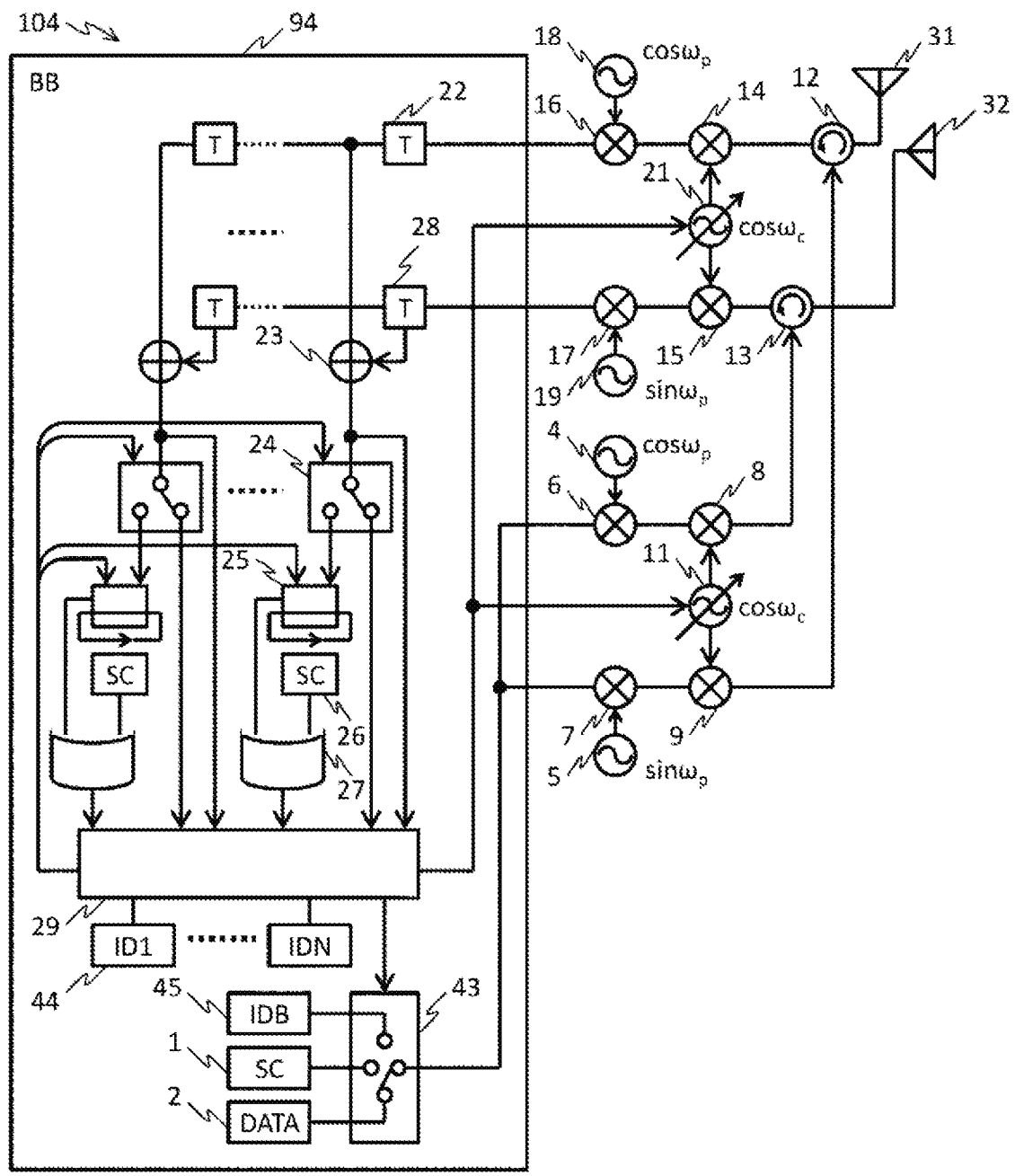
FIG. 4 is a diagram illustrating an example of the wireless device in Embodiment 4.

In the present embodiment, an example in which a throughput of the entire wireless system is improved compared to Embodiments 1 to 3 will be described with reference to FIG. 4. FIG. 4 is a diagram illustrating an example of a wireless device 104 of the present embodiment. The wireless device 104 is a wireless device corresponding to the wireless devices 101, 201, and 103 of the wireless system described with reference to FIGS. 1 and 3, the same circuit as that in FIG. 3 is denoted by the same reference numeral as that in FIG. 3, and a description thereof will be omitted.

The wireless device 104 illustrated in FIG. 4 is different from the wireless device 103 illustrated in FIG. 3 in that an identification number is assigned to each of a plurality of wireless devices 104 included in the wireless system, and a plurality of the identification numbers of the wireless device 104 is stored in an identification number storage circuit 44, and the wireless device 104 includes an identification number generator 45 instead of the mode switching signal generator 41.

The arithmetic unit 29 of the wireless device 104 (transmitter) causes the identification number generator 45 to generate a content (identification number) of the identification number storage circuit 44, performs control so that the identification number is output using the transmission three changeover switch 43, and the identification number is transmitted from the first antenna 31 and the second antenna 32.

The arithmetic unit 29 of the wireless device 104 (receiver) surveils the output of the synthesis circuit 23, determines whether the identification number received by the first antenna 31 and the second antenna 32 and output through the synthesis circuit 23 coincides with the identification number assigned to the wireless device 104. When it is determined that the identification number received by the first antenna 31 and the second antenna 32 and output through the synthesis circuit 23 coincides with the identification number assigned to the wireless device 104, the wireless communication is executed as described in Embodiment 1, and when it is determined that the identification number received by the first antenna 31 and the second antenna 32 and output through the synthesis circuit 23 does not coincide with the identification number assigned to the wireless device 104, the wireless communication for transmission of the relevant identification number is not executed.

When the wireless device 104 determined to not coincide performs transmission for another wireless communication, transmission may be performed at a frequency (channel) different from a frequency for transmitting the identification number determined not to coincide.

According to the present embodiment, since the wireless device 104 in the wireless system receives the identification number, it is possible to detect that another pair of wireless devices 104 performing communication is present. Thus, it is possible to change the frequency used for transmission by the wireless device 104 detecting the presence by the transmission carrier variable frequency generator 11.

With the change of frequency, it is possible to improve the communication quality of the entire wireless system by preventing the interference with the communication performed by another pair of wireless devices 104 and increase the number of pairs of the wireless devices 104 performing communication by different frequencies at overlapping time, and there is an effect that the throughput of the entire wireless system is improved.

Embodiment 5

Figure 5:
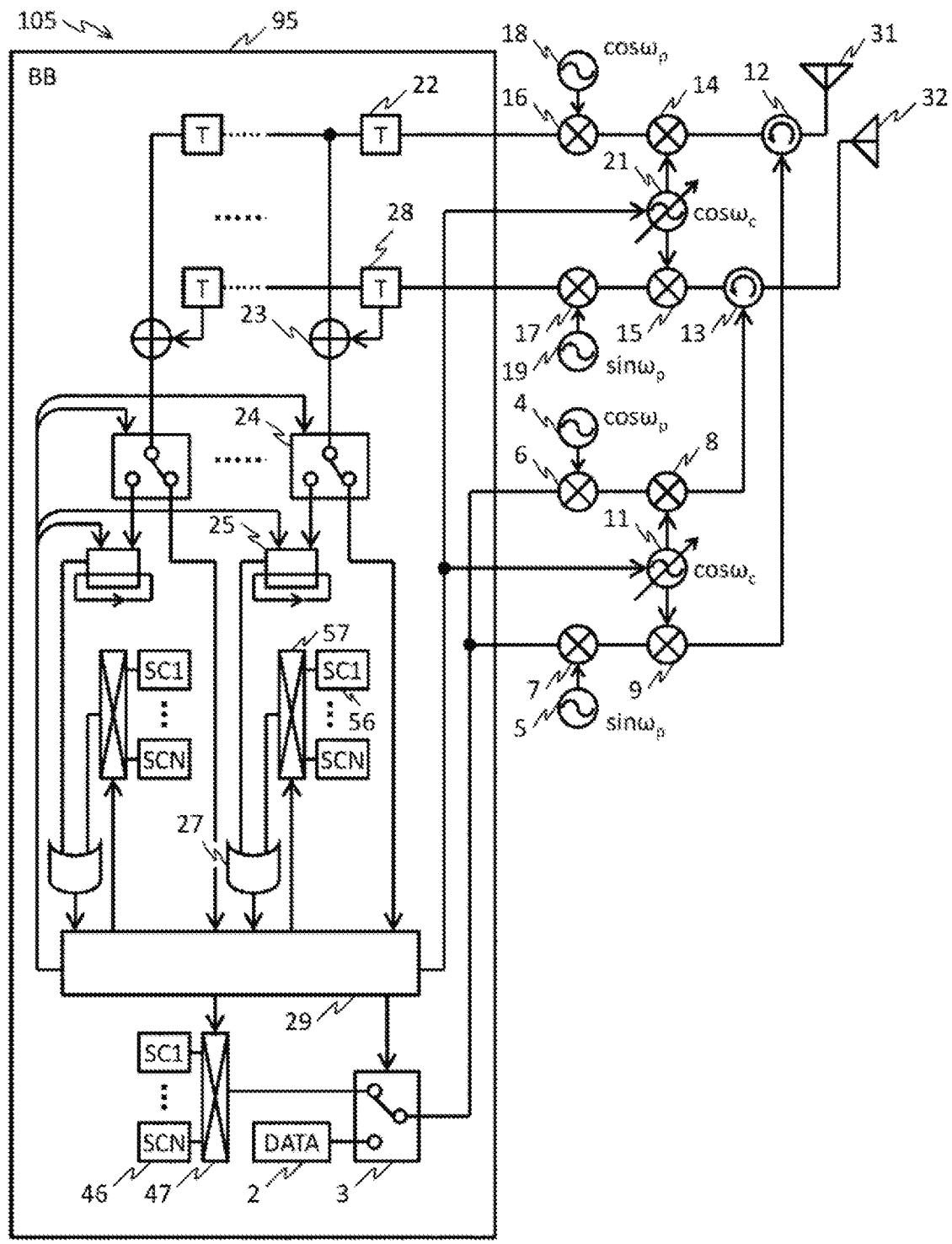
FIG. 5 is a diagram illustrating an example of the wireless device in Embodiment 5.

In the present embodiment, another example in which the throughput of the entire wireless system is improved compared to Embodiments 1 to 4 will be described with reference to FIGS. 5, 17A, and 17B. FIG. 5 is a diagram illustrating an example of a wireless device 105 of the present embodiment. The wireless device 105 is a wireless device corresponding to the wireless devices 101 and 201 of the wireless system described with reference to FIG. 1, the same circuit as that in FIG. 1 is denoted by the same reference numeral as that in FIG. 1, and a description thereof will be omitted.

The wireless device 105 illustrated in FIG. 5 is different from the wireless device 101 illustrated in FIG. 1 in that the wireless device 105 includes a plurality of orthogonal synchronization code generators 46 and a synchronization code selection circuit 47 for selecting the plurality of orthogonal synchronization code generators 46 instead of the synchronization code generator 1, and the wireless device 105 includes a plurality of orthogonal synchronization code generators 56 and a synchronization code selection circuit 57 for selecting the plurality of orthogonal synchronization code generators 56 instead of the synchronization code generator 26.

Figure 17A:
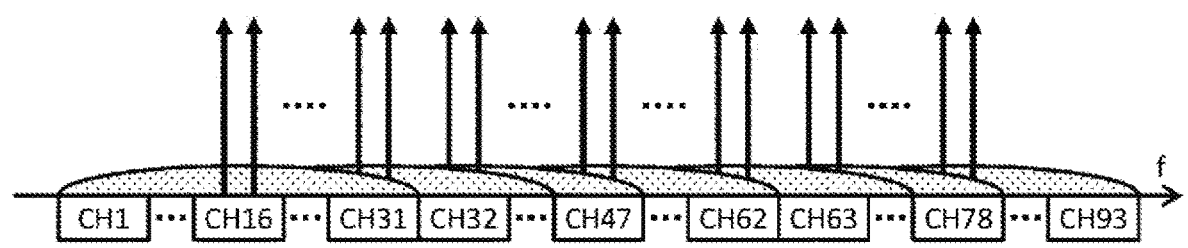
FIG. 17A is a diagram illustrating an example of the frequency band of the synchronization code in Embodiments 5 and 6.
Figure 17B:
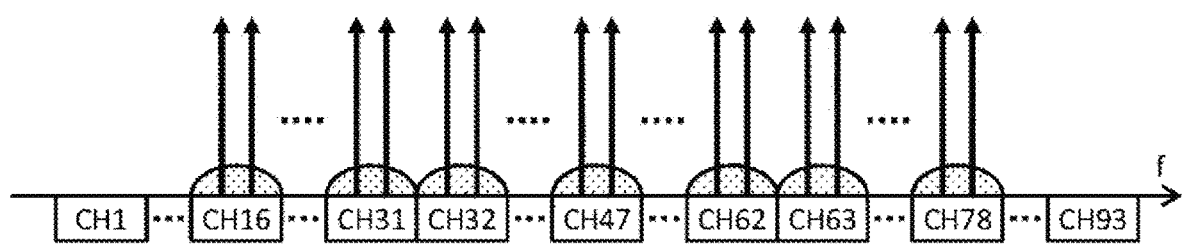
FIG. 17B is a diagram illustrating an example of the frequency band of the data string in Embodiments 5 and 6.

FIGS. 17A and 17B are diagrams illustrating examples of frequency bands used by the wireless system by the wireless device 105 according to the present embodiment. In this example, as in Embodiment 1, the wireless system uses a communication frequency band, that is, 93 channels. As illustrated in FIG. 17B, one channel is occupied for the transmission of the data string. On the other hand, as illustrated in FIG. 17A, 31 channels are occupied for the transmission of the polarized wave synchronization.

Each of the plurality of wireless devices 105 transmits the synchronization code using different orthogonal identification codes and different carrier frequencies (channels). Therefore, even when the time for transmitting the synchronization code overlaps and the frequency band occupied by the synchronization code is superimposed as illustrated in FIG. 17A, the interference between the codes due to the overlap is prevented by orthogonality of the codes.

According to the present embodiment, when the wireless communication is performed using the plurality of frequencies, there are effects that it is possible to perform the polarized wave synchronization at a plurality of frequencies at overlapping time, and a time until the polarized wave synchronization at the plurality of frequencies is completed is greatly shortened, and the throughput of the entire wireless system is improved.

Embodiment 6

Figure 6:
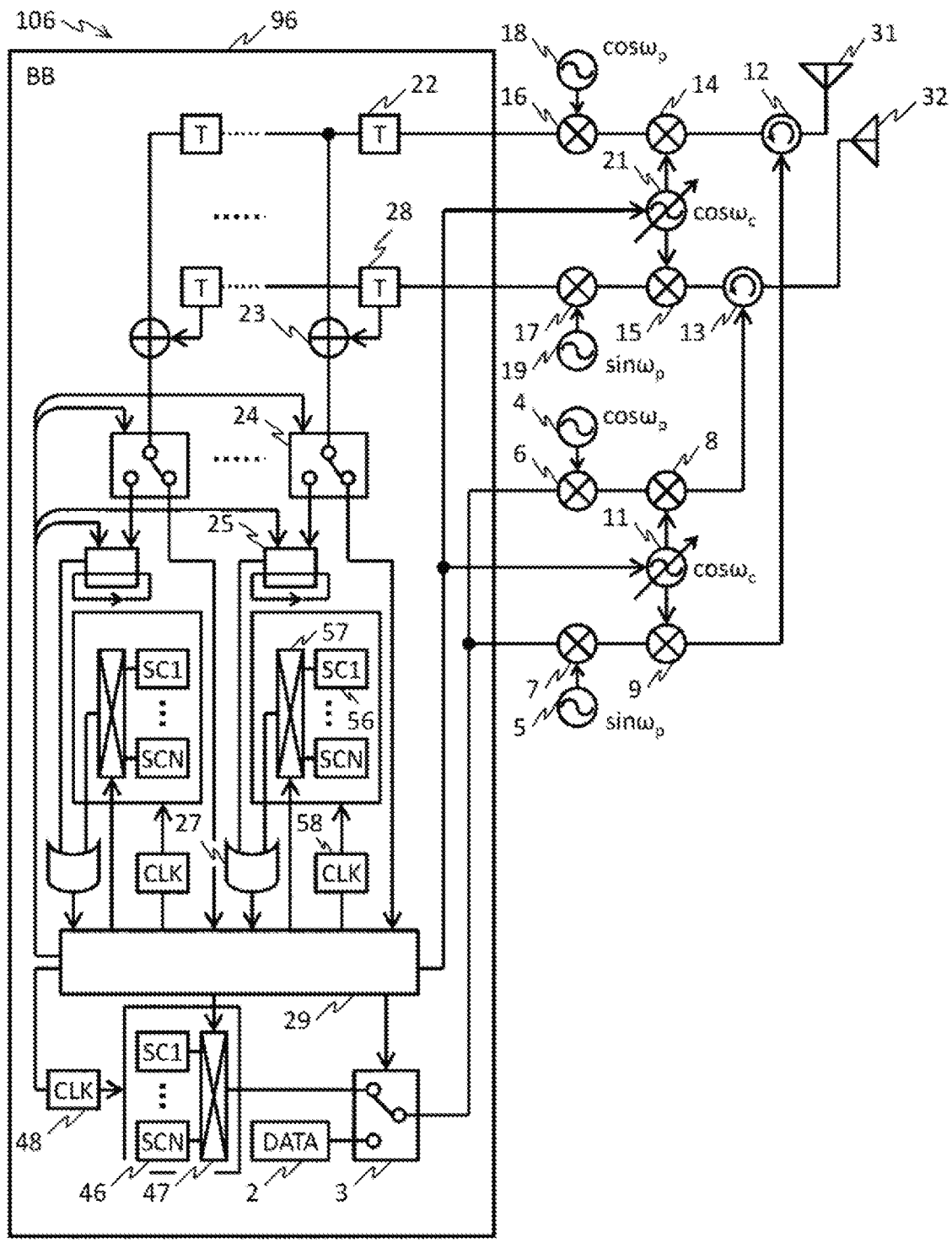
FIG. 6 is a diagram illustrating an example of the wireless device in Embodiment 6.

In the present embodiment, another example in which the throughput of the entire wireless system is improved compared to Embodiments 1 to 4 will be described with reference to FIGS. 6 and 17A. FIG. 6 is a diagram illustrating an example of a wireless device 106 of the present embodiment. The wireless device 106 is a wireless device corresponding to the wireless devices 101, 201, and 105 of the wireless system described with reference to FIGS. 1 and 5, the same circuit as that in FIG. 5 is denoted by the same reference numeral as that in FIG. 5, and a description thereof will be omitted.

The wireless device 106 illustrated in FIG. 6 is different from the wireless device 105 illustrated in FIG. 5 in that the wireless device 106 includes a transmission clock circuit 48 and a reception clock circuit 58 controlled by the arithmetic unit 29, and in transmission, the plurality of orthogonal synchronization code generators 46 and the synchronization code selection circuit 47 for selecting the plurality of orthogonal synchronization code generators 46 change an occupied frequency band of an orthogonal synchronization code by the transmission clock circuit 48.

In response to the change in the occupied frequency band of the orthogonal synchronization code in the transmission, in reception, the plurality of orthogonal synchronization code generators 56 and the synchronization code selection circuit 57 for selecting the plurality of orthogonal synchronization code generators 56 change the occupied frequency band of the orthogonal synchronization code by the reception clock circuit 58.

A representative example of the orthogonal code is an M sequence, a bit length of the M sequence is $2^N-1$ (N is an integer), and there is a unique restriction in the bit length in many cases. Since it is inevitable to adopt a scattered value of the bit length, it is inevitable to adopt a bit length not capable of efficiently using an area of integer multiple times of the frequency band used for transmitting the synchronization code illustrated in FIG. 17A in some cases.

According to the present embodiment, since it is possible to increase available types of orthogonal codes by adjusting the frequency for generating and reconstructing the orthogonal synchronization code and perform the polarized wave synchronization at overlapping time, there are effects that it is possible to increase the carrier frequency, reduce the time for performing the polarized wave synchronization of the whole system, and improve the throughput of the whole wireless system.

Embodiment 7

Figure 7:
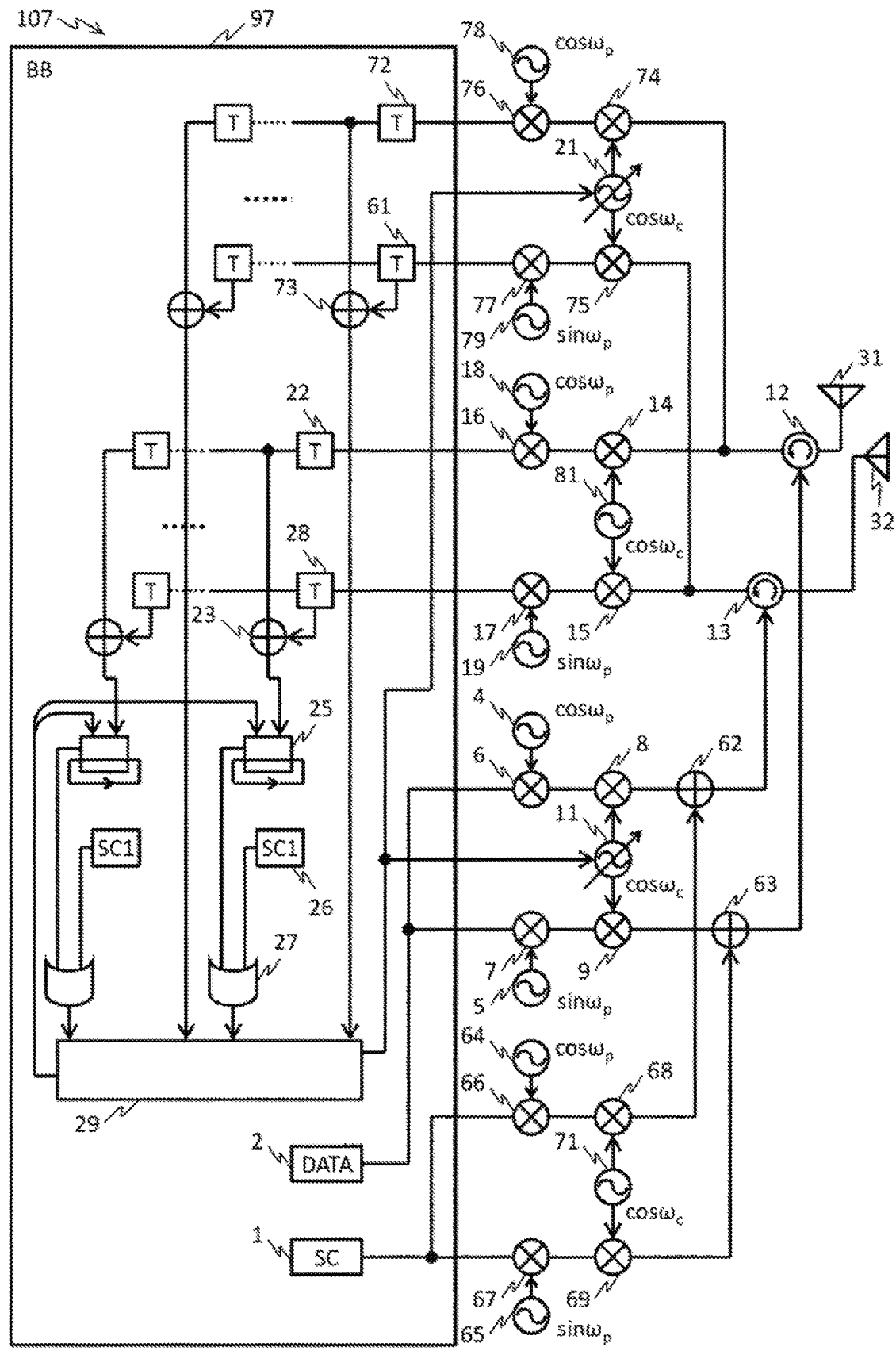
FIG. 7 is a diagram illustrating an example of the wireless device in Embodiment 7.

In the present embodiment, an example in which the synchronization code and the data string are transmitted at overlapping time compared to Embodiments 1 to 6 will be described with reference to FIGS. 7, 18, and 20D. FIG. 7 is a diagram illustrating an example of a wireless device 107 of the present embodiment. The output of the data string generator 2 is branched into two, and one is coupled to the input of the first rotationally polarized wave transmission mixer 6.

The output of the transmission rotationally polarized wave frequency cosine wave generator 4 is coupled to the local input of the first rotationally polarized wave transmission mixer 6, the output of the first rotationally polarized wave transmission mixer 6 is coupled to the input of the first carrier transmission mixer 8, the output of the transmission carrier variable frequency generator 11 is coupled to the local input of the first carrier transmission mixer 8, and the output of the first carrier transmission mixer 8 is coupled to a first input of a first transmission synthesizer 62.

The other of the two branches of the output of the data string generator 2 is coupled to the input of the second rotationally polarized wave transmission mixer 7, and the output of the transmission rotationally polarized wave frequency sine wave generator 5 is coupled to the local input of the second rotationally polarized wave transmission mixer 7.

The output of the second rotationally polarized wave transmission mixer 7 is coupled to an input of the second carrier transmission mixer 9, the output of the transmission carrier variable frequency generator 11 is coupled to the local input of the second carrier transmission mixer 9, the output of the second carrier transmission mixer 9 is coupled to a first input of a second transmit synthesizer 63.

The output of the synchronization code generator 1 is branched into two, one is coupled to an input of a third rotationally polarized wave transmission mixer 66, and an output of a transmission rotationally polarized wave frequency cosine wave generator 64 is coupled to a local input of the third rotationally polarized wave transmission mixer 66.

An output of the third rotationally polarized wave transmission mixer 66 is coupled to an input of a third carrier transmission mixer 68, an output of a transmission carrier fixed frequency generator 71 is coupled to a local input of the third carrier transmission mixer 68, and an output of the third carrier transmission mixer 68 is coupled to a second input of the first transmission synthesizer 62.

The other of the two branches of the output of the synchronization code generator 1 is coupled to an input of a fourth rotationally polarized wave transmission mixer 67, an output of a transmission rotationally polarized wave frequency sine wave generator 65 is coupled to a local input of the fourth rotationally polarized wave transmission mixer 67.

An output of the fourth rotationally polarized wave transmission mixer 67 is coupled to an input of a fourth carrier transmission mixer 69, the output of the transmission carrier fixed frequency generator 71 is coupled to a local input of the fourth carrier transmission mixer 69, and an output of the fourth carrier transmission mixer 69 is coupled to a second input of the second transmission synthesizer 63.

An output of the first transmission synthesizer 62 is coupled to the third terminal of the second circulator 13, an output of the second transmission synthesizer 63 is coupled to the third terminal of the first circulator 12, the first antenna 31 is coupled to the first terminal of the first circulator 12, and an output of the second terminal of the first circulator 12 is branched into two.

One of the two branches is coupled to the input of the first carrier reception mixer 14, an output of a reception carrier fixed frequency generator 81 is coupled to the local input of the first carrier reception mixer 14, and the output of the first carrier reception mixer 14 is coupled to the input of the first rotationally polarized wave reception mixer 16.

The output of the reception rotationally polarized wave frequency cosine wave generator 18 is coupled to the local input of the first rotationally polarized wave reception mixer 16, the output of the first rotationally polarized wave reception mixer 16 is coupled to the input of the initial stage of the plurality of first delay circuits 22 that are serially connected to each other, and the outputs that are sequentially time-delayed by the plurality of first delay circuits 22 are input to the first inputs of the plurality of synthesis circuits 23, respectively.

The other of the two branches of the output of the second terminal of the first circulator 12 is coupled to an input of a third carrier reception mixer 74, the output of the reception carrier variable frequency generator 21 is coupled to a local input of the third carrier reception mixer 74, and an output of the third carrier reception mixer 74 is coupled to an input of a third rotationally polarized wave reception mixer 76.

An output of a reception rotationally polarized wave frequency cosine wave generator 78 is coupled to a local input of the third rotationally polarized wave reception mixer 76, an output of the third rotationally polarized wave reception mixer 76 is coupled to an input of an initial stage of a plurality of third delay circuits 72 that are serially connected to each other, and outputs that are sequentially time-delayed by the plurality of third delay circuits 72 are input to first inputs of a plurality of second synthesis circuits 73, respectively.

The second antenna 32 is coupled to the first terminal of the second circulator 13, an output of the second terminal of the second circulator 13 is branched into two, one is coupled to the input of the second carrier reception mixer 15, an output of the reception carrier fixed frequency generator 81 is coupled to the local input of the second carrier reception mixer 15, and the output of the second carrier reception mixer 15 is coupled to the input of the second rotationally polarized wave reception mixer 17.

The output of the reception rotationally polarized wave frequency sine wave generator 19 is coupled to the local input of the second rotationally polarized wave reception mixer 17, the output of the second rotationally polarized wave reception mixer 17 is coupled to the input of the initial stage of the plurality of second delay circuits 28 that are serially connected to each other, and the outputs that are sequentially time-delayed by the plurality of second delay circuits 28 are input to the second inputs of the plurality of synthesis circuits 23, respectively.

The other of the two branches of the output of the second terminal of the second circulator 13 is coupled to an input of a fourth carrier reception mixer 75, the output of the reception carrier variable frequency generator 21 is coupled to a local input of the fourth carrier reception mixer 75, and an output of the fourth carrier reception mixer 75 is coupled to an input of a fourth rotationally polarized wave reception mixer 77.

An output of a reception rotationally polarized wave frequency sine wave generator 79 is coupled to a local input of the fourth rotationally polarized wave reception mixer 77, an output of the fourth rotationally polarized wave reception mixer 77 is coupled to an input of an initial stage of a plurality of fourth delay circuits 61 that are serially connected to each other, and outputs that are sequentially time-delayed by the plurality of fourth delay circuits 61 are input to second inputs of the plurality of second synthesis circuits 73, respectively.

The output of the plurality of synthesis circuits 23 are input to the input of the sliding correlation device 25, the output of the sliding correlation device 25 and the output of the synchronization code generator 26 are compared with each other by the comparator 27, the output of the comparator 27 is input to the arithmetic unit 29, and outputs of the plurality of second synthesis circuits 73 are directly input to the arithmetic unit 29.

The synchronization code generator 1, the data string generator 2, the first delay circuit 22, the second delay circuit 28, the synthesis circuit 23, the sliding correlation device 25, the synchronization code generator 26, the comparator 27, the arithmetic unit 29, the third delay circuit 72, the fourth delay circuit 61, and the second synthesis circuit 73 are included in a digital signal processing circuit 97. The digital signal processing circuit 97 may be a baseband circuit. The first antenna 31 and the second antenna 32 may be provided outside the wireless device 107 or inside the wireless device 107.

Figure 18:
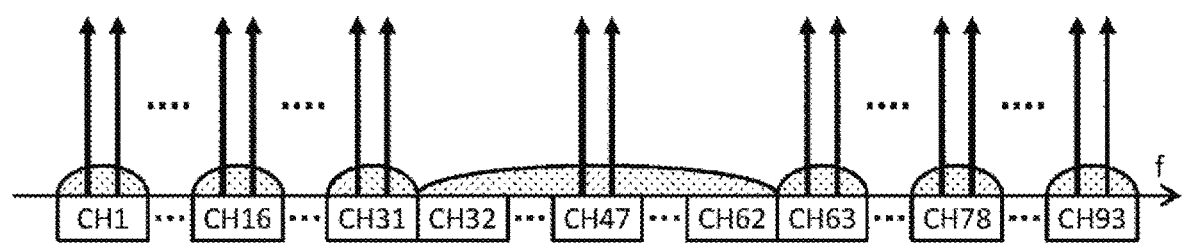
FIG. 18 is a diagram illustrating an example of a frequency band in Embodiments 7 and 8.

FIG. 18 is a diagram illustrating an example of a frequency band used by the wireless system of the present embodiment. In this example, the wireless system uses a communication frequency band, that is, 93 channels. In the present embodiment, as illustrated in FIG. 18, a dedicated frequency band (31 channels from CH32 to CH62) for transmitting the synchronization code is set, and the frequency band for transmitting the data string is set outside the dedicated frequency band for transmitting the synchronization code.

Therefore, the transmission carrier fixed frequency generator 71 and the reception carrier fixed frequency generator 81 illustrated in FIG. 7 may generate a carrier of a frequency corresponding to CH47, and the transmission carrier variable frequency generator 11 and the reception carrier variable frequency generator 21 may generate a carrier of a frequency corresponding to one of channels among CH0 to CH31 or CH63 to CH93.

As described above, in the present embodiment, the transmission of the data string and the transmission of the synchronization code are performed completely independently. Each of the process related to the transmission of the data string and the process during the transmission of the synchronization code are the same as those of Embodiment 1, but since the frequency at which the polarized wave synchronization is performed is not completely identical with the frequency at which the data transmission is performed, when these frequencies are separated, accuracy of polarized wave synchronization during the data transmission is not guaranteed.

On the other hand, by overlapping the time for the independent transmission of the data string and transmission of the synchronization code, when the frequency band used by the wireless system (for transmission of the data string) is narrow, the time for the polarized wave synchronization is hidden behind the time for the data transmission, and it is possible to eliminate the time for the polarized wave synchronization from a communication time.

Since it is possible to detect the change in the wireless environment surrounding the wireless system in real time by continuing the transmission of the synchronization code, tolerance to the degradation of the communication quality due to the change in the wireless environment is strengthened. An example of the timing at which the synchronization code and the data string are transmitted according to the present embodiment is as illustrated in FIG. 20D, and it is obvious that the time for the transmission of the synchronization code is hidden.

According to the present embodiment, when the frequency band used by the wireless system is narrow, since it is possible to substantially allocate the communication time to the data transmission, it is effective for improving a transmission speed of the wireless system and stabilizing the communication quality against the change in the wireless environment.

Embodiment 8

Figure 8:
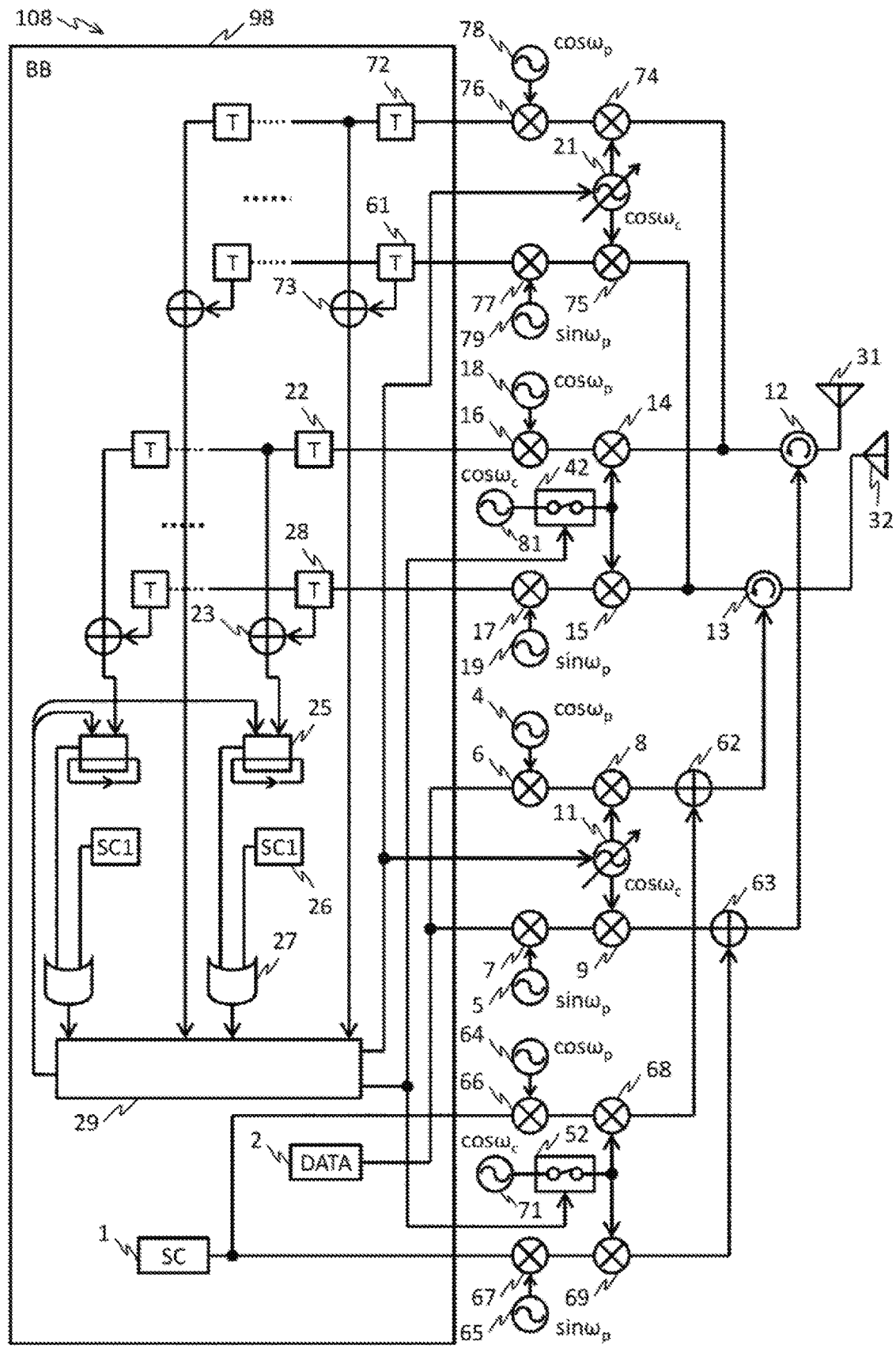
FIG. 8 is a diagram illustrating an example of the wireless device in Embodiment 8.

In the present embodiment, an example in which the communication quality is improved compared to Embodiment 7 will be described with reference to FIG. 8. FIG. 8 is a diagram illustrating an example of a wireless device 108 of the present embodiment. The wireless device 108 is a wireless device corresponding to the wireless device 107 described with reference to FIG. 7, the same circuit as that in FIG. 7 is denoted by the same reference numeral as that in FIG. 7, and a description thereof will be omitted.

The wireless device 108 illustrated in FIG. 8 is different from the wireless device 107 illustrated in FIG. 7 in that the wireless device 108 includes a polarized wave synchronization transmission carrier block switch 52 that blocks the output of the transmission carrier fixed frequency generator 71 and a polarized wave synchronization reception carrier block switch 42 that blocks the output of the reception carrier fixed frequency generator 81.

The polarized wave synchronization transmission carrier block switch 52 is inserted between the transmission carrier fixed frequency generator 71, the third carrier transmission mixer 68, and the fourth carrier transmission mixer 69, and the polarized wave synchronization reception carrier block switch 42 is inserted between the reception carrier fixed frequency generator 81, the first carrier reception mixer 14, and the second carrier reception mixer 15.

The polarized wave synchronization transmission carrier block switch 52 and the polarized wave synchronization reception carrier block switch 42 are controlled by the arithmetic unit 29. When the change in the wireless environment surrounding the wireless system is small, since the change in the polarized wave is small, it is unnecessary to perform the polarized wave synchronization frequently. Therefore, after detecting the polarized wave synchronization, the transmission of the synchronization code is stopped for a certain term (time set in advance) when it is detected that there is no change in the wireless environment.

The arithmetic unit 29 of the wireless device 108 stores information on the polarized wave synchronization every time the polarized wave synchronization is performed. When the arithmetic unit 29 determines a change in the stored information at a time set in advance does not exceed a threshold set in advance, or determines a signal from outside the wireless device 108, and performs control for the polarized wave synchronization transmission carrier block switch 52 and the polarized wave synchronization reception carrier block switch 42 to execute blocking.

Since it is possible to stop the electromagnetic wave, not the transmission itself of the data string present during the term in which the data string is transmitted in the frequency band used by the wireless system, by stopping the transmission of the synchronization code, the interference against the transmission of the data string is reduced, and the reception sensitivity of the data string is improved. According to the present embodiment, there is an effect that communication quality is improved when the change in the wireless environment surrounding the wireless system is small.

Embodiment 9

Figure 9:
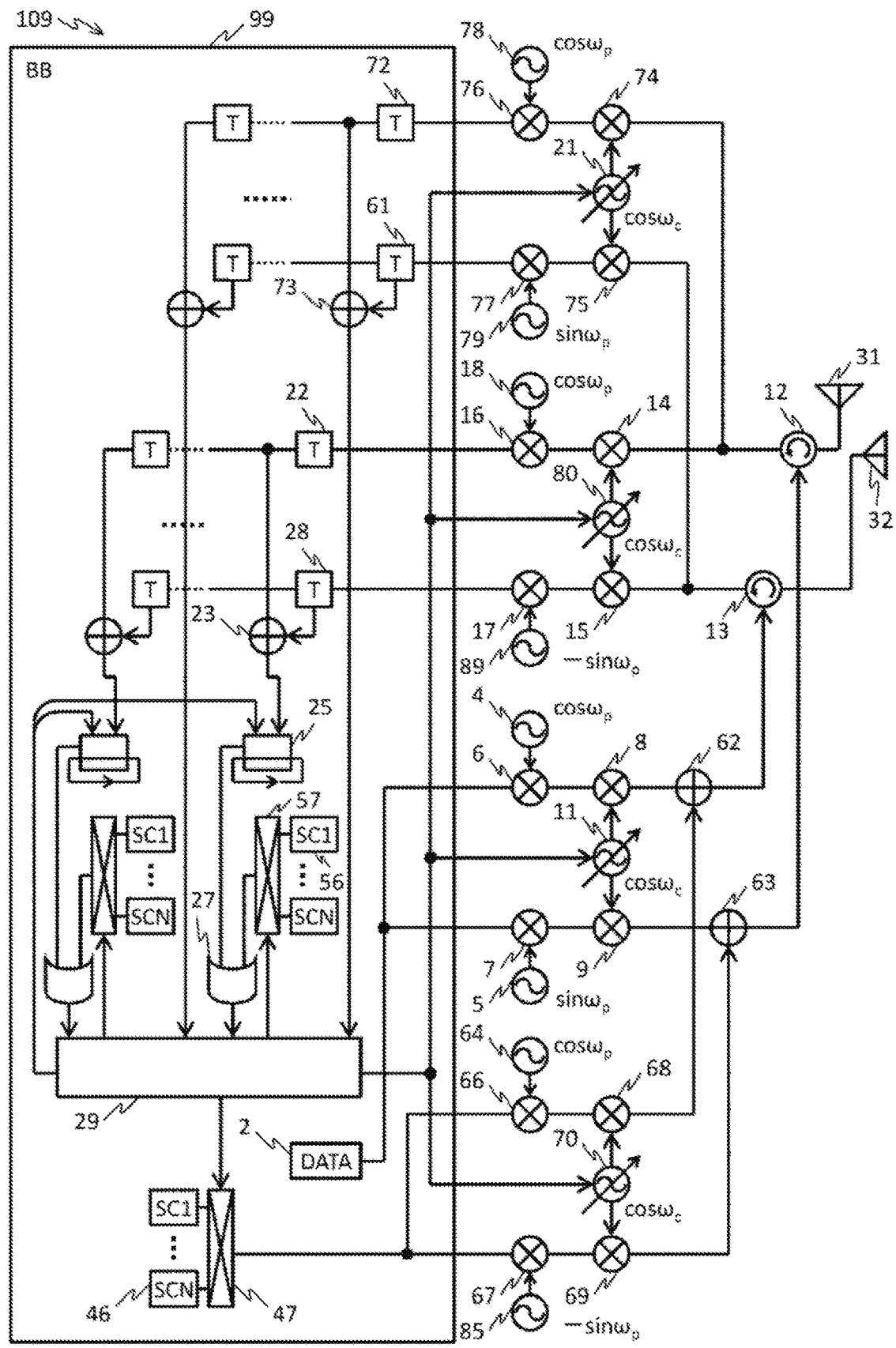
FIG. 9 is a diagram illustrating an example of the wireless device in Embodiment 9.

In the present embodiment, another example in which the synchronization code and the data string are transmitted at overlapping time compared to Embodiments 7 and 8 will be described with reference to FIGS. 9, 19, and 20D. FIG. 9 is a diagram illustrating an example of a wireless device 109 of the present embodiment. The wireless device 109 is a wireless device corresponding to the wireless device 107 described with reference to FIG. 7, the same circuit as that in FIG. 7 is denoted by the same reference numeral as that in FIG. 7, and a description thereof will be omitted.

The wireless device 109 illustrated in FIG. 9 is different from the wireless device 107 illustrated in FIG. 7 in that the wireless device 109 includes a second transmission carrier variable frequency generator 70 instead of the transmission carrier fixed frequency generator 71, and includes a second reception carrier variable frequency generator 80 instead of the reception carrier fixed frequency generator 81.

Another difference is that the wireless device 109 includes a transmission rotationally polarized wave frequency negative sine wave generator 85 instead of the transmission rotationally polarized wave frequency sine wave generator 65, and includes a reception rotationally polarized wave frequency negative sine wave generator 89 instead of the reception rotationally polarized wave frequency sine wave generator 19.

Another difference is that the wireless device 109 includes a plurality of orthogonal synchronization code generators 46 and a synchronization code selection circuit 47 for selecting the plurality of orthogonal synchronization code generators 46 instead of the synchronization code generator 1, and includes a plurality of orthogonal synchronization code generators 56 and a synchronization code selection circuit 57 for selecting the plurality of orthogonal synchronization code generators 56 instead of the synchronization code generator 26.

Under the control of the arithmetic unit 29, the second transmission carrier variable frequency generator 70 generates a carrier of the same frequency as the transmission carrier variable frequency generator 11, and the second reception carrier variable frequency generator 80 generates a carrier of the same frequency as the reception carrier variable frequency generator 21.

In the present embodiment, the synchronization code and the data string are transmitted at overlapping time by rotationally polarized waves of inverse rotation directions of the polarized waves in overlapping frequency from the first antenna 31 and the second antenna 32 spatially orthogonal to each other.

As long as the spatial orthogonality of the first antenna and the second antenna 32 is maintained, since the rotationally polarized waves of inverse rotation directions are orthogonal and signals are able to be transmitted independently each other, the data string and the synchronization code are able to be transmitted at overlapping time and overlapping frequency. To transmit the synchronization codes at a plurality of different frequencies, different orthogonal synchronization codes orthogonal to each other are used as the synchronization codes.

Figure 19:
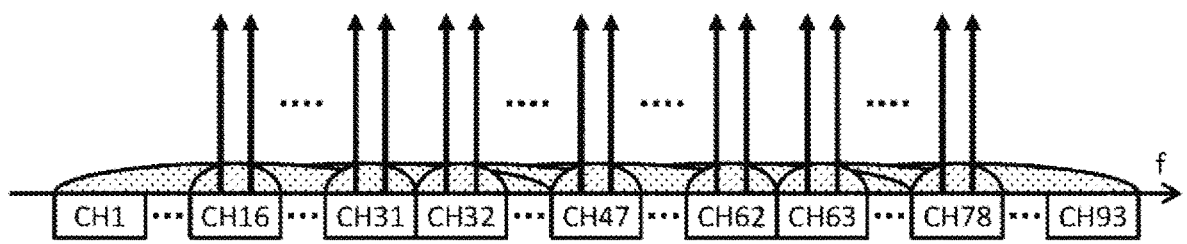
FIG. 19 is a diagram illustrating an example of the frequency band in Embodiments 9 and 10.

FIG. 19 is a diagram illustrating an example of a frequency band used by the wireless system of the present embodiment, and in this example, the wireless system uses a communication frequency band, that is, 93 channels. The example of FIG. 19 illustrates that the synchronization code and the data string are transmitted at the same carrier frequency at overlapping time by using orthogonality of a plurality of orthogonal synchronization codes and rotationally polarized waves of different rotation directions.

Figure 20D:
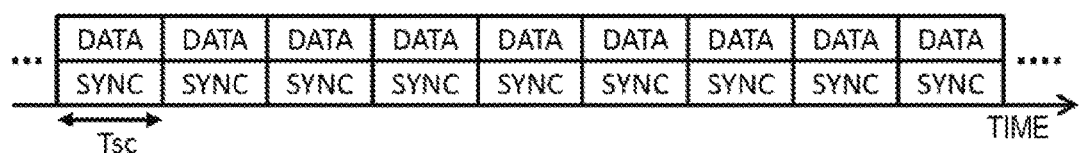
FIG. 20D is a diagram illustrating an example of the sequence of the synchronization code and the data string in Embodiments 7 and 9.

An example of timing for transmitting the synchronization code and the data string according to the present embodiment is as illustrated in FIG. 20D, and a transmission time of the synchronization code is hidden in the transmission of the data string. According to the present embodiment, since both the surveillance of the change in the wireless environment surrounding the wireless system and a high quality data transmission becomes possible, a wireless system with high reliability and high security in which a sensor, an actuator, and a control network are combined for realizing IoT is provided.

Embodiment 10

Figure 10:
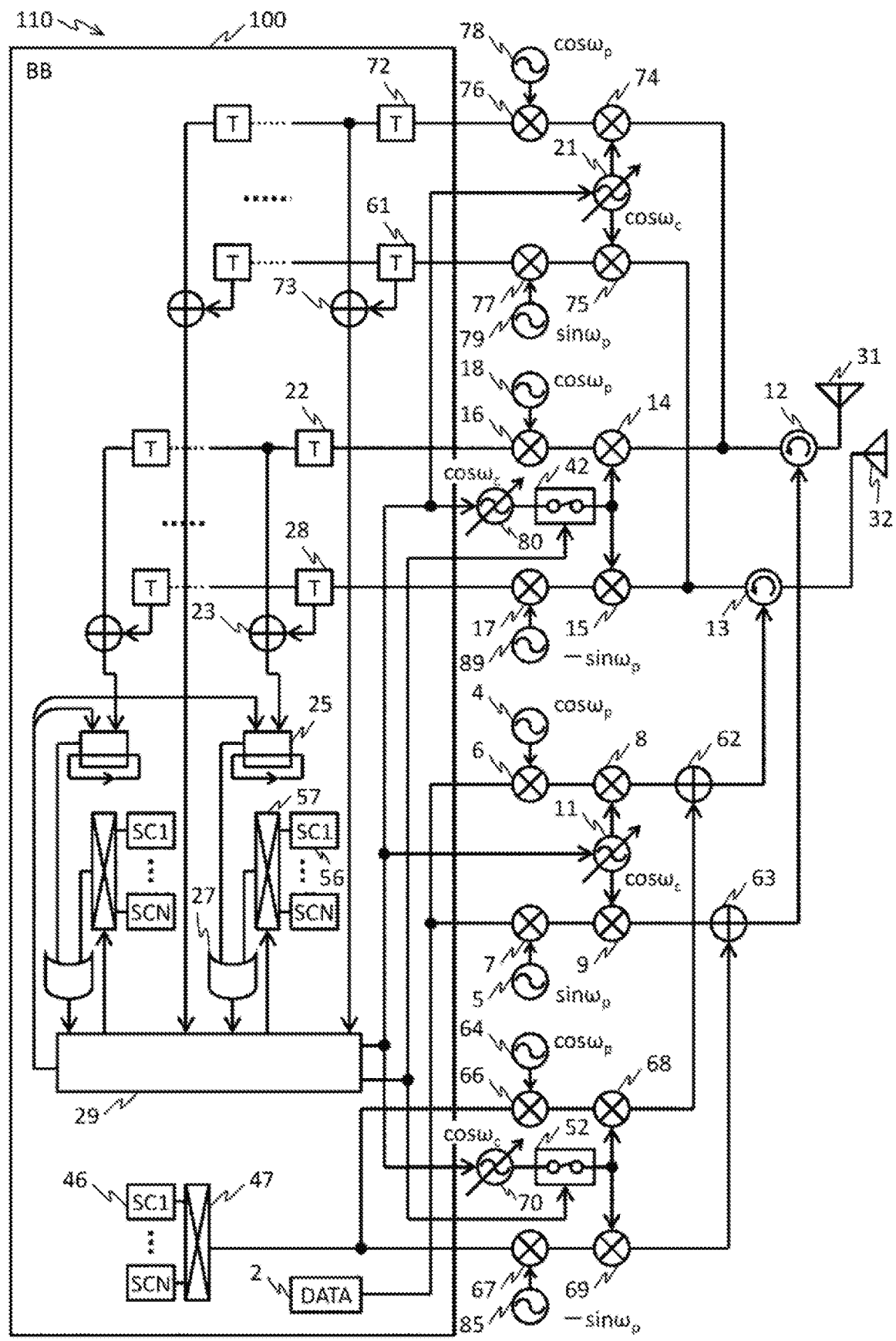
FIG. 10 is a diagram illustrating an example of the wireless device in Embodiment 10.

In the present embodiment, another example in which the communication quality is improved compared to Embodiments 7 to 9 will be described with reference to FIG. 10. FIG. 10 is a diagram illustrating an example of a wireless device 110 of the present embodiment. The wireless device 110 is a wireless device corresponding to the wireless device 109 described with reference to FIG. 9, the same circuit as that in FIG. 9 is denoted by the same reference numeral as that in FIG. 9, and a description thereof will be omitted.

The wireless device 110 illustrated in FIG. 10 is different from the wireless device 109 illustrated in FIG. 9 in that the wireless device 110 includes the polarized wave synchronization transmission carrier block switch 52 that blocks the output of the second transmission carrier variable frequency generator 70 and the polarized wave synchronization reception carrier block switch 42 that blocks the output of the second reception carrier variable frequency generator 80.

The polarized wave synchronization transmission carrier block switch 52 is inserted between the second transmission carrier variable frequency generator 70, the third carrier transmission mixer 68, and the fourth carrier transmission mixer 69, and the polarized wave synchronization reception carrier block switch 42 is inserted between the second reception carrier variable frequency generator 80, the first carrier reception mixer 14, and the second carrier reception mixer 15.

As described in Embodiment 8, the polarized wave synchronization transmission carrier block switch 52 and the polarized wave synchronization reception carrier block switch are controlled by the arithmetic unit 29, and the transmission of the synchronization code is stopped.

According to this example, while maintaining the effect of Embodiment 9, it is possible to give the same effect provided to Embodiment 7 by Embodiment 8 and Embodiment 9. As it is apparent from FIGS. 18 and 19, since the number of carrier frequencies available for the polarized wave synchronization in the present embodiment is larger than that in embodiment 8, a degree of the effect given to Embodiment 7 by the present embodiment is larger than a degree of the effect provided to Embodiment 7 by Embodiment 8.

Embodiment 11

Figure 11:
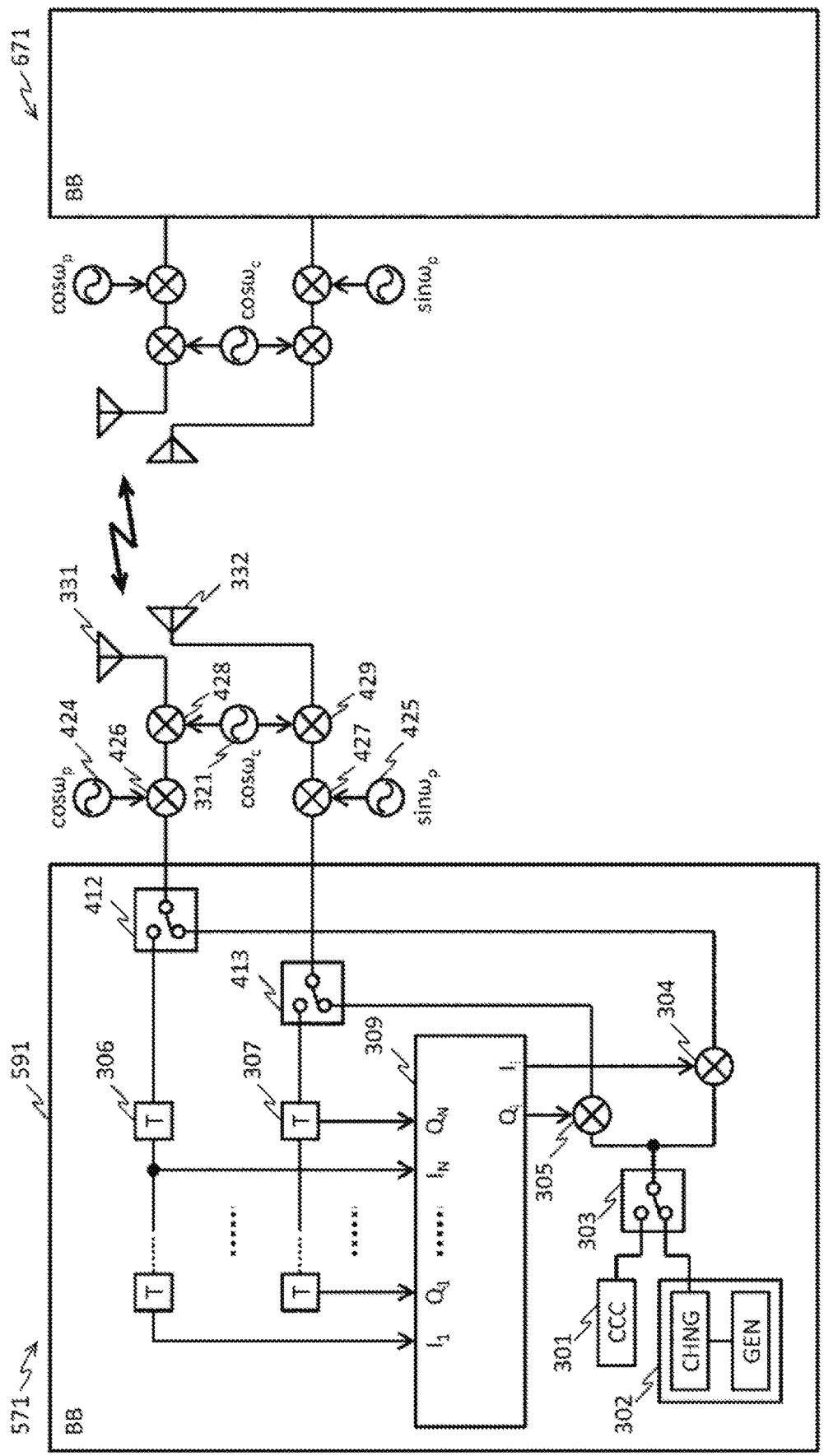
FIG. 11 is a diagram illustrating an example of the wireless system in Embodiment 11.

In the present embodiment, an example of an operation of the wireless system for preventing communication data interception by an external person will be described with reference to FIGS. 11, 22A, 22B, and 24. FIG. 11 is a diagram illustrating an example of the wireless system. The example of the wireless system illustrated in FIG. 11 includes of a pair of a wireless device 571 and a wireless device 671, and since the configurations of the wireless device 571 and the wireless device 671 are the same, the wireless device 571 will be described, and a description of the wireless device 671 will be omitted.

A channel estimation code generator 301 and a data string generator 302 are respectively coupled to two inputs of a transmission changeover switch 303, the output of the transmission changeover switch 303 is branched into two, and one is coupled to an input of a zero phase multiplier 304 and is coupled to a first switching contact point of a first transmission/reception changeover switch 412 after a zero phase channel signal output from a digital arithmetic circuit 309 is superimposed.

The other of the two branches of the output of the transmission changeover switch 303 is coupled to an input of a quadrature phase multiplier 305 and is coupled to a first switching contact point of a second transmission/reception changeover switch 413 after a quadrature phase channel signal output from the digital arithmetic circuit 309 is superimposed.

A first transmission/reception contact point of a first rotationally polarized wave transmission/reception mixer 426 is coupled to a common contact point of the first transmission/reception changeover switch 412, and an output of a transmission/reception rotationally polarized wave frequency cosine wave generator 424 is coupled to a local input of the first rotationally polarized wave transmission/reception mixer 426.

A first transmission/reception contact point of a first carrier transmission/reception mixer 428 is coupled to a second transmission/reception contact point of the first rotationally polarized wave transmission/reception mixer 426, an output of a carrier frequency generator 321 is coupled to a local input of the first carrier transmission/reception mixer 428, and a first antenna 331 is coupled to a second transmission/reception contact point of the first carrier transmission/reception mixer 428.

A first transmission/reception contact point of a second rotationally polarized wave transmission/reception mixer 427 is coupled to a common contact point of the second transmission/reception changeover switch 413, and an output of a transmission/reception rotationally polarized wave frequency sine wave generator 425 is coupled to a local input of the second rotationally polarized wave transmission/reception mixer 427.

A first transmission/reception contact point of a second carrier transmission/reception mixer 429 is coupled to a second transmission/reception contact point of the second rotationally polarized wave transmission/reception mixer 427, the output of the carrier frequency generator 321 is coupled to a local input of the second carrier transmission/reception mixer 429, and a second antenna 332 spatially orthogonal to the first antenna 331 is coupled to a second transmission/reception contact point of the second carrier transmission/reception mixer 429.

A plurality of zero phase delay devices 306 are cascade-connected to a second switching contact point of the first transmission/reception changeover switch 412, outputs of each of the zero phase delay devices 306 are sequentially branched and input to the digital arithmetic circuit 309, a plurality of quadrature phase delay devices 307 cascade-connect to a second switching contact point of the second transmission/reception changeover switch 413, and outputs of the quadrature phase delay devices 307 are sequentially branched and input to the digital arithmetic circuit 309.

The channel estimation code generator 301, the data string generator 302, the transmission changeover switch 303, the zero phase multiplier 304, the digital arithmetic circuit 309, the first transmission/reception changeover switch 412, the quadrature phase multiplier 305, the second transmission/reception changeover switch 413, the zero phase delay device 306, and the quadrature phase delay device 307 are formed in a baseband circuit 591. The first antenna 331 and the second antenna 332 may be provided outside the wireless device 571 or inside the wireless device 571.

Figure 24:
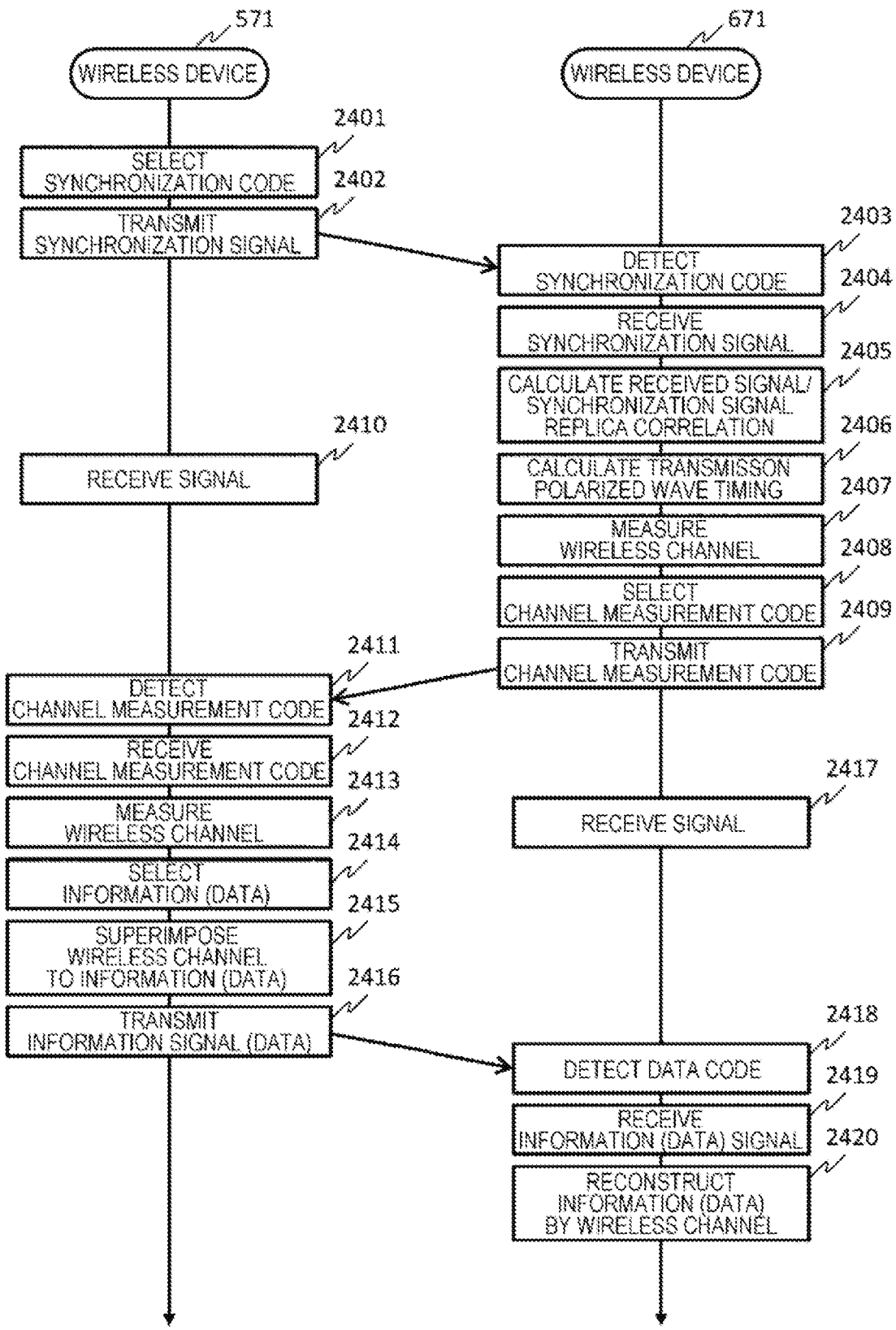
FIG. 24 is a diagram illustrating an example of the communication procedure of the wireless system in Embodiments 11 to 13.

A communication procedure of the wireless system of the present embodiment will be described with reference to FIG. 24. First, the transmission changeover switch 303 selects the output of the channel estimation code generator 301 of the wireless device 571 (step 2401). Then, the channel estimation code generator 301 outputs the synchronization code.

The digital arithmetic circuit 309 adjusts inputs of the zero phase multiplier 304 and the quadrature phase multiplier 305 so that the synchronization code is branched into two, and the synchronization code is directly transmitted to the first transmission/reception changeover switch 412 and the second transmission/reception changeover switch 413 through the zero phase multiplier 304 and the quadrature phase multiplier 305, respectively.

The synchronization codes from the common contact point of the first transmission/reception changeover switch 412 and the second transmission/reception changeover switch 413 are respectively input to the first rotationally polarized wave transmission/reception mixer 426 and the second rotationally polarized wave transmission/reception mixer 427, and the output of the transmission/reception rotationally polarized wave frequency cosine wave generator 424 and the output of the transmission/reception rotationally polarized wave frequency sine wave generator 425 are superimposed at the each mixer.

The superimposed output is subsequently up-converted by the output of the carrier frequency generator 321 through the first carrier transmission/reception mixer 428 and the second carrier transmission/reception mixer 429 and is radiated to space from the first antenna 331 and the second antenna 332 spatially orthogonal to each other (step 2402).

The wireless device 671 receives the signal transmitted by the wireless device 571 (step 2404). Note that a detection of the synchronization code (step 2403) will be described later. In the following description, an operation of a circuit in the wireless device 671 will be described using reference numerals of the wireless device 571 of the same configuration for the sake of convenience.

Each received signal of the first antenna 331 and the second antenna 332 of the wireless device 671 is down-converted by the output of the carrier frequency generator 321 by the first carrier transmission/reception mixer 428 and the second carrier transmission/reception mixer 429, respectively.

The two signals obtained by the down-conversion are successively converted into baseband signals, respectively, using outputs of the transmission/reception rotationally polarized wave frequency cosine wave generator 424 and the transmission/reception rotationally polarized wave frequency sine wave generator 425, by the first rotationally polarized wave transmission/reception mixer 426 and the second rotationally polarized wave transmission/reception mixer 427.

The converted baseband signals are input to the cascade connection of the plurality of zero phase delay devices 306 and the cascade connection of the plurality of quadrature phase delay devices 307 by the first transmission/reception changeover switch 412 and the second transmission/reception changeover switch 413, respectively, and each output of the plurality of zero phase delay devices 306 and the plurality of quadrature phase delay devices 307 is branched and individually input to the digital arithmetic circuit 309.

The digital arithmetic circuit 309 of the wireless device 671 holds a replica of the synchronization code of the channel estimation code generator 301 of the wireless device 571. When the synchronization code transmitted from the wireless device 571 is detected from the received signal (step 2403), the sliding correlation calculation using the received signal and the synchronization code replica is performed (step 2405), transmission timing of the wireless device is detected (step 2406), and synchronization between the wireless device 571 and the wireless device 671 is established.

After establishing the synchronization, the wireless device 671 measures strength and phases of the baseband signals of both phases from the baseband signals of the zero phase and the quadrature phase obtained from the signal transmitted from the wireless device 571 (step 2407), and generates a communication channel from the measured strength and phases. That is, the digital arithmetic circuit 309 generates a plurality of communication channels at different times within one period of the rotationally polarized wave determined by phase amounts of the zero phase delay device 306 and the quadrature phase delay device 307.

After the measurement of the channel related to the wireless necessary for generating the communication channel is completed, in the wireless device 671, by the same procedure in which the wireless device 571 transmits the synchronization code, the channel estimation code generator 301 generates channel measurement code (step 2408) and the generated channel measurement code is transmitted (step 2409).

After transmitting the synchronization code for a certain time in step 2402, in the wireless device 571, the first transmission/reception changeover switch 412 and the second transmission/reception changeover switch 413 select the cascade connection of the plurality of zero phase delay devices 306 and the plurality of quadrature phase delay devices 307, respectively, and the signal is received (step 2410).

By the same procedure as the procedure in which the wireless device 671 receives the synchronization signal, the wireless device 571 receives the signal transmitted by the wireless device 671, detects the channel measurement code (step 2411), receives the channel measurement code (step 2412), measures the strength and phase of the signal by the same procedure as the wireless device 671 (step 2413), and generates a communication channel.

Since the wireless device 571 and the wireless device 671 are of the same configuration and generate the communication channel by the same procedure, as long as the wireless environment surrounding the wireless devices 571 and 671 does not change, the communication channels generated by the wireless devices 571 and 671 are the same.

Since the change in the wireless environment is caused by a physical change in the environment surrounding the wireless devices 571 and 671, the wireless device 571 and 671 are able to share the communication channel by generating the communication channel at a speed higher than the physical change in the environment surrounding the wireless devices 571 and 671.

When the environment surrounding the wireless devices 571 and 671 changes by time, the communication channels shared by the wireless devices 571 and 671 also change by time. Since the shared communication channels are unique to a physical position and the like of the wireless devices 571 and 671, it is physically impossible for an external person to know the communication channels shared by the wireless devices 571 and 671.

After the wireless device 571 generates the communication channel, the transmission changeover switch 303 inputs the output of the data string generator 302 to the zero phase multiplier 304 and the quadrature phase multiplier 305 (step 2414). Here, a combination rule shared by the wireless device 571 and the wireless device 671 in advance is applied to the output of the data string generator 302, and the rule will be described later.

The digital arithmetic circuit 309 uses a plurality of communication channels obtained at different timings within one period of the rotationally polarized wave and uses the combination rule shared by the wireless device 571 and the wireless device 671 in advance to generate signals of different combinations of the same set over a plurality of periods of the rotationally polarized waves by pairing the data string output from data string generator 302 with a certain combination of a set of the same communication channel in one period of the rotationally polarized wave at each timing (step 2415).

When the wireless device 571 starts the data transmission, by the same procedure as the procedure in which the synchronization code is transmitted to the wireless device 671, the wireless device 571 first transmits a special information signal (notification signal of data transmission start), and then transmits a signal for transmitting the data string (step 2416).

After transmitting the channel measurement code for a certain time in step 2409, in the wireless device 671, the first transmission/reception changeover switch 412 and the second transmission/reception changeover switch 413 select the cascade connection of the plurality of zero phase delay devices 306 and the cascade connection of the plurality of quadrature phase delay devices 307, respectively, and the signal is received (step 2417).

By the same procedure as the procedure of receiving the synchronization code, the wireless device 671 receives the signal transmitted by the wireless device 571, detects the special information signal notifying the data transmission start transmitted by the wireless device 571 (step 2418), and obtains the baseband signal of the data string transmitted by the wireless device 571 (step 2419) by the same procedure as the procedure when generating the communication channel.

The wireless device 671 reconstructs the obtained baseband signal using the combination rule shared by the wireless devices 571 and 671 in advance and a generated communication channel of different timing within one period of the rotationally polarized wave (step 2420).

Figure 22A:
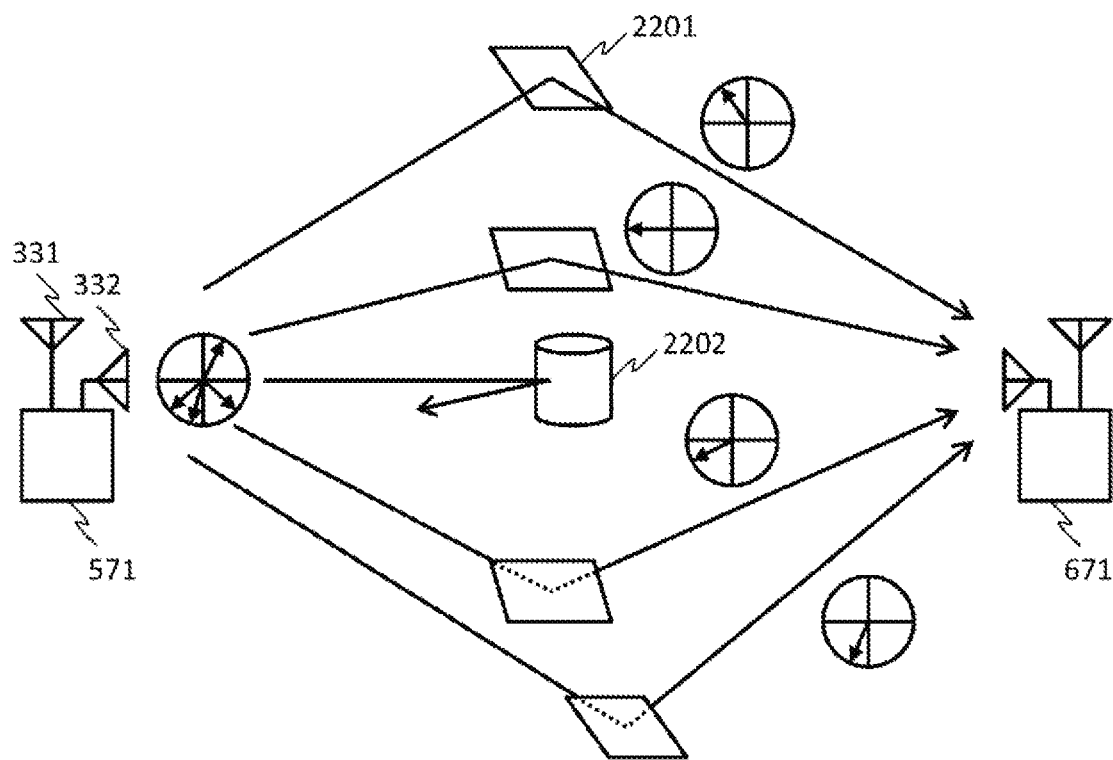
FIG. 22A is a diagram illustrating an example of a wireless environment in Embodiments 11 to 13.

FIG. 22A illustrates an example of the wireless environment in which the wireless devices 571 and 671 of the present embodiment are placed. When the wireless device 571 radiates the electromagnetic wave with the rotationally polarized wave from the first antenna 331 and the second antenna 332 in steps 2402 and 2416 of FIG. 24, as illustrated in FIG. 22A, a reflected wave is generated by a reflecting surface 2201 of an apparatus in the environment surrounding the wireless devices 571 and 671 to reach the wireless device 671, and a direct wave is blocked by an apparatus 2202.

As already described, the electromagnetic wave reflected by the reflecting surface 2201 is polarized-wave-shifted, and the polarized wave shift is constant as long as the position of the reflecting surface 2201 or the positions of the wireless devices 571 and 671 regarding the reflecting surface 2201 do not change. When transmission is performed by the same polarized wave as that received by the wireless device 671, the wireless device 571 also receives the same polarized wave as that transmitted by the wireless device 571.

When the position of the reflecting surface 2201 or the position of the wireless devices 571 and 671 regarding the reflecting surface 2201 changes, the polarized wave shift in the reflecting surface 2201 changes. Therefore, unless the communication channel is shared every time the position changes, it is impossible to perform reception by the polarized wave corresponding to the polarized wave of transmission (to which the polarized wave shift is added).

Figure 22B:
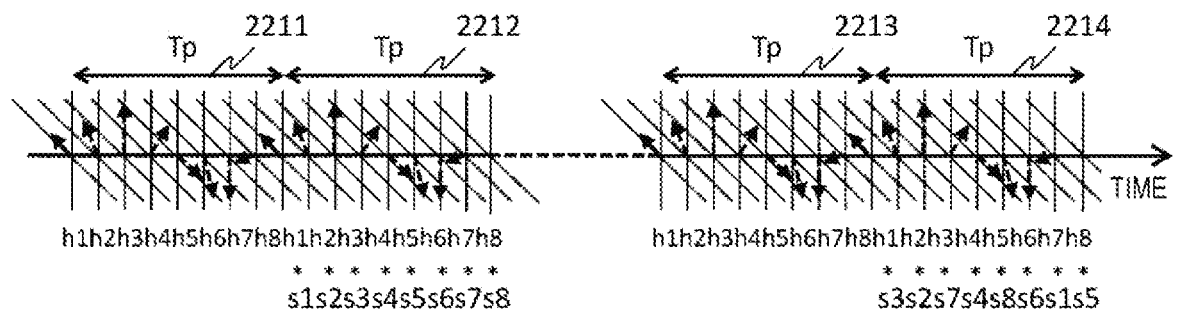
FIG. 22B is a diagram illustrating an example of a communication channel in Embodiments 11 to 13.

FIG. 22B illustrates an example of pairings of the communication channels with different timings within one period of the rotationally polarized wave and the data string output from the data string generator 302. In the example of FIG. 22B, reference numerals h1 to h8 denote the communication channels, the polarized wave of the rotationally polarized wave, the time of transmission/reception. Tp is one period of rotationally polarized wave.

Although a channel measurement code (or synchronization code) is omitted in FIG. 22B, periods 2211 and 2213 are periods for transmitting the channel measurement codes, and periods 2212 and 2214 are periods for transmitting the data strings. Reference numerals s1 to s8 denote a sequence of bits of the data string, reference numerals h1*s1, h2*s2, h3*s3, and the like of the period 2212 and reference numerals h1*s3, h2*s2, h3*s7 and the like of the period 2214 denote pairings of the communication channel and the data string.

Such pairings are the combination rules shared between the wireless device 571 and the wireless device 671 in advance and may be set in each of the wireless device 571 and the wireless device 671 in advance. In the period 2212 and the period 2214, it is preferable that the combination is different according to the period as the combination of the paired communication channel and data string is different.

Therefore, when the data string to be transmitted is 8 bits, the data string generator 302 illustrated in FIG. 11 may include a circuit for generating s1s2s3s4s5s6s7s8 and a circuit for changing the generates 8 bits to s1s2s3s4s5s6s7s8 (no change) as in the period 2212 or changing the generated 8 bits to s3s2s7s4s8s6s1s5 as in the period 2214 according to the combination rule shared in advance.

According to the present embodiment, since an external person existing at a place other than a place where the wireless device 571 and the wireless device 671 are installed does not have means for knowing the communication channel shared by the wireless device 571 and the wireless device 671, even when the signal of the data string paired with the communication channel is intercepted, the data string cannot be reconstructed from the intercepted signal, and highly secure wireless communication in which the transmission information is transmitted while being concealed against the external person is possible.

Embodiment 12

Figure 12:
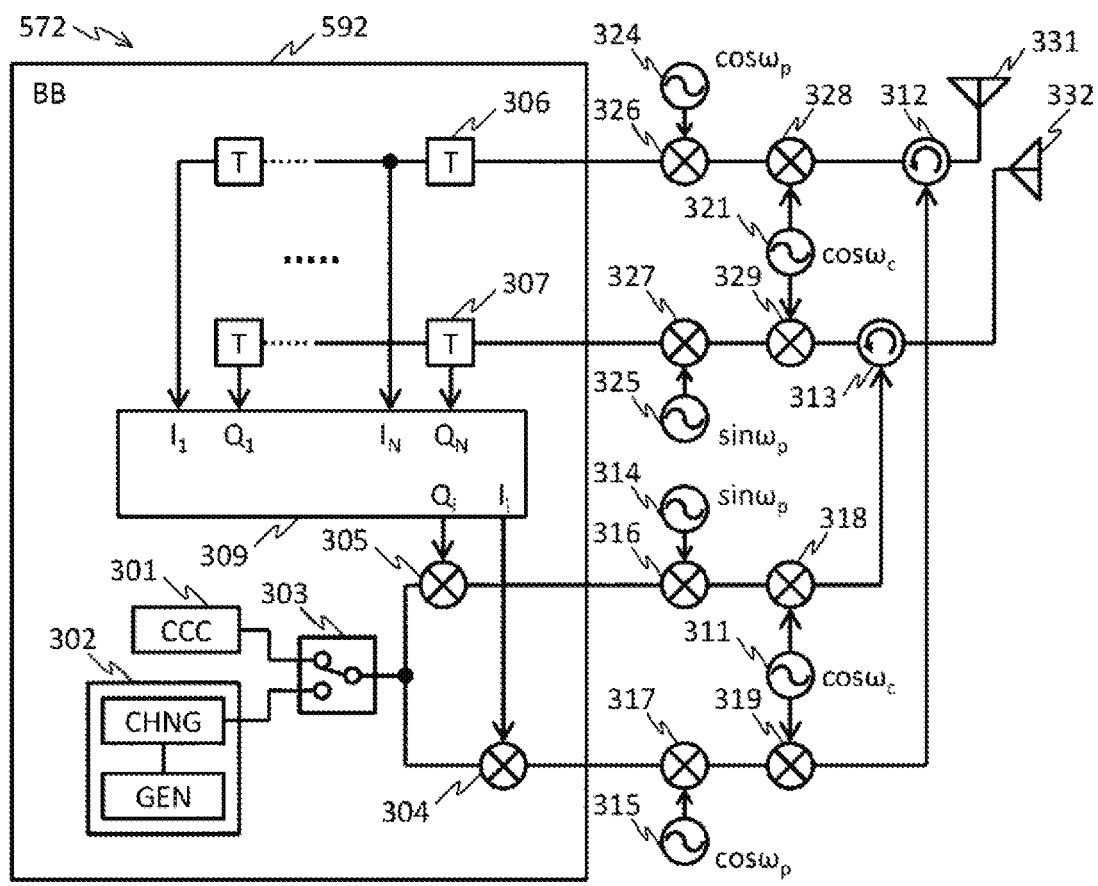
FIG. 12 is a diagram illustrating an example of the wireless device in Embodiment 12.
Figure 25:
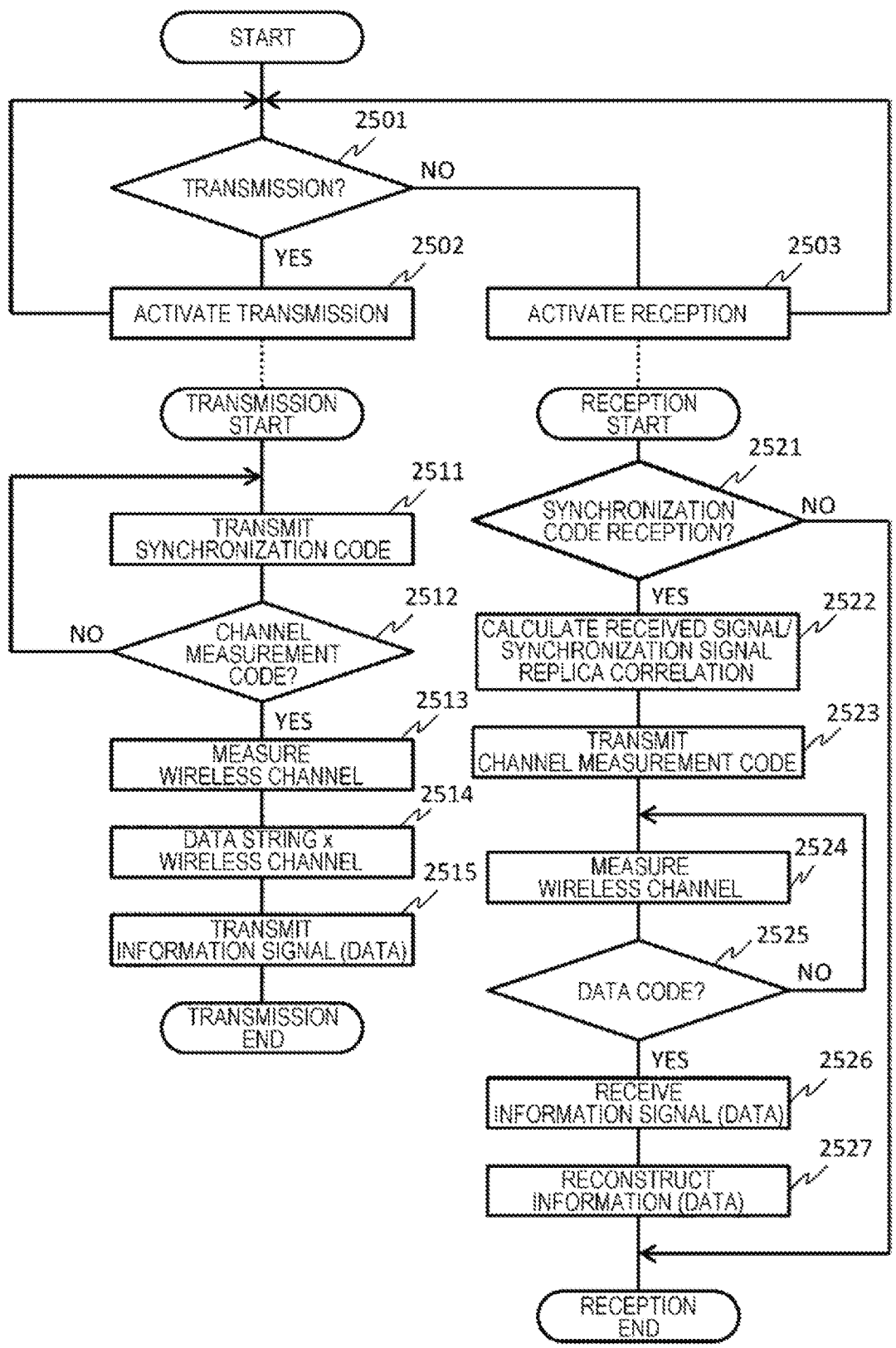
FIG. 25 is a diagram illustrating an example of a process procedure of the wireless device in Embodiment 12.

In the present embodiment, an example in which the transmission circuit and the reception circuit of the eleventh embodiment are separated will be described with reference to FIGS. 12 and 25. FIG. 12 is a diagram illustrating an example of the wireless device 572 of the present embodiment. The wireless device 572 illustrated in FIG. 12 does not include the first transmission/reception changeover switch 412 and the second transmission/reception changeover switch 413 of the wireless device 571 illustrated in FIG. 11.

Instead, the channel estimation code generator 301 and the data string generator 302 are respectively coupled to the two inputs of the transmission changeover switch 303, the output of the transmission changeover switch 303 is branched into two, one is coupled to the input of the quadrature phase multiplier 305 and is coupled to an input of a first rotationally polarized wave transmission mixer 316 after a quadrature phase channel signal output from the digital arithmetic circuit 309 is superimposed.

An output of a transmission rotationally polarized wave frequency sine wave generator 314 is coupled to a local input of the first rotationally polarized wave transmission mixer 316, an input of a first carrier transmission mixer 318 is coupled to an output of the first rotationally polarized wave transmission mixer 316, an output of a carrier frequency generator 311 is coupled to a local input of the first carrier transmission mixer 318, and a third terminal of a second circulator 313 is coupled to an output of the first carrier transmission mixer 318.

The other of the two branches of the output of the transmission changeover switch 303 is coupled to the input of the zero phase multiplier 304 and is coupled to an input of a second rotationally polarized wave transmission mixer 317 after the zero phase channel signal output from the digital arithmetic circuit 309 is superimposed. An output of a transmission rotationally polarized wave frequency cosine wave generator 315 is coupled to a local input of the second rotationally polarized wave transmission mixer 317.

An input of a second carrier transmission mixer 319 is coupled to an output of the second rotationally polarized wave transmission mixer 317, the output of the carrier frequency generator 311 is coupled to a local input of the second carrier transmission mixer 319, and a third terminal of a first circulator 312 is coupled to an output of the second carrier transmission mixer 319.

The first antenna 331 is coupled to a first terminal of the first circulator 312, the second antenna 332 spatially orthogonal to the first antenna 331 is coupled to a first terminal of the second circulator 313, and an input of a first carrier reception mixer 328 is coupled to a second terminal of the first circulator 312.

The output of the carrier frequency generator 321 is coupled to a local input of the first carrier reception mixer 328, an input of a first rotationally polarized wave reception mixer 326 is coupled to an output of the first carrier reception mixer 328, and an output of a reception rotationally polarized wave frequency cosine wave generator 324 is coupled to a local input of the first rotationally polarized wave reception mixer 326.

An input of a second carrier reception mixer 329 is coupled to a second terminal of the second circulator 313, the output of the carrier frequency generator 321 is coupled to a local input of the second carrier reception mixer 329, an input of a second rotationally polarized wave reception mixer 327 is coupled to an output of the second carrier reception mixer 329, and an output of a reception rotationally polarized wave frequency sine wave generator 325 is coupled to a local input of the second rotationally polarized wave reception mixer 327.

The plurality of zero phase delay devices 306 are cascade-connected to an output of the first rotationally polarized wave reception mixer 326, the outputs of each of the zero phase delay devices 306 are sequentially branched and input to the digital arithmetic circuit 309, the plurality of quadrature phase delay devices 307 are cascade-connected to an output of the second rotationally polarized wave reception mixer 327, and the outputs of each of the quadrature phase delay devices 307 are sequentially branched and input to the digital arithmetic circuit 309.

The channel estimation code generator 301, the data string generator 302, the transmission changeover switch 303, the zero phase multiplier 304, the digital arithmetic circuit 309, the quadrature phase multiplier 305, the zero phase delay device 306, and the quadrature phase delay device 307 are formed in a baseband circuit 592. The first antenna 331 and the second antenna 332 may be provided outside the wireless device 572 or inside the wireless device 572.

An operation procedure of the wireless device 572 of the present embodiment will be described with reference to FIG. 25. In the following description, regarding the description of the wireless device 572 as a subject, the subject of description may be replaced with the digital arithmetic circuit 309 or may be replaced with a processor not illustrated in the wireless device 572.

The wireless device 572 determines whether to perform transmission (step 2501). This determination may be, for example, a determination of whether there is data to be transmitted to a sensor connected to the wireless device 572. When the wireless device 572 determines that the transmission is to be performed, the wireless device 572 proceeds to step 2502 to activate a transmission process. When the wireless device 572 determines that the transmission is not to be performed, the wireless device 572 proceeds to step 2503 to activate a reception process and returns to step 2501.

The transmission process activated in step 2502 is from step 2511 to step 2515, and the reception process activated in step 2503 is from step 2521 to step 2527.

Since the wireless device 572 returns to step 2501 after activating the processes in each of step 2502 and step 2503, the transmission process from step 2511 to step 2515 and the reception process from step 2521 to step 2527 are activated without waiting mutual process completion and independently executed.

When the transmission process is activated in step 2502, the wireless device 572 selects the output of the channel estimation code generator 301 by the transmission changeover switch 303, the channel estimation code generator 301 outputs the synchronization code, and the output synchronization code advances the circuit as described with reference to FIG. 12 and is radiated to space by the first antenna 331 and the second antenna 332 (step 2511).

In the wireless device 572, the respective received signals of the first antenna 331 and the second antenna 332 advance the circuit as described with reference to FIG. 12 and are input to the digital operation circuit 309, it is determined whether the received signal is the channel measurement code (step 2512), and when it is determined that the received signal is not the channel measurement code, the wireless device 572 returns to step 2511.

When it is determined that the received signal is the channel measurement code in step 2512, the wireless device 572 measures the wireless channel (step 2513), selects the output of the data string generator 302 by the transmission changeover switch 303, pairs the data string with the wireless channel as described in Embodiment 11 (step 2514), transmits the data by irradiating to space by the first antenna 331 and the second antenna 332 (step 2515), and ends the transmission process.

When the reception process is activated in step 2503, in the wireless device 572, the respective received signals of the first antenna 331 and the second antenna 332 advances the circuit as described with reference to FIG. 12 and are input to the digital arithmetic circuit 309, it is determined whether the received signal is the synchronization code (step 2521), when it is determined that the received signal is not the synchronization code, the reception process ends.

When it is determined that the received signal is the synchronization code in step 2521, the wireless device 572 calculates the correlation between the received signal and the synchronization signal replica (step 2522), transmits the channel measurement code (step 2523), and measures the wireless channel (step 2524). The wireless device 572 determines whether the received signal is the data code (step 2525), and when it is determined that the received signal is not the data code, the wireless device 572 returns to step 2524.

When it is determined that the received signal is the data code in step 2525, the wireless device 572 receives an information signal to be data (step 2526), reconstructs the data (step 2527) as described in Embodiment 11, and ends the reception process.

According to the present embodiment, since transmission/reception of the synchronization code or the channel measurement code using the rotationally polarized wave and transmission/reception of the data code are performed at overlapping time, the time required for the wireless device 572 to generate the communication channel is shortened, and there is an effect that the throughput of the wireless system using the wireless device 572 is improved.

Embodiment 13

Figure 13:
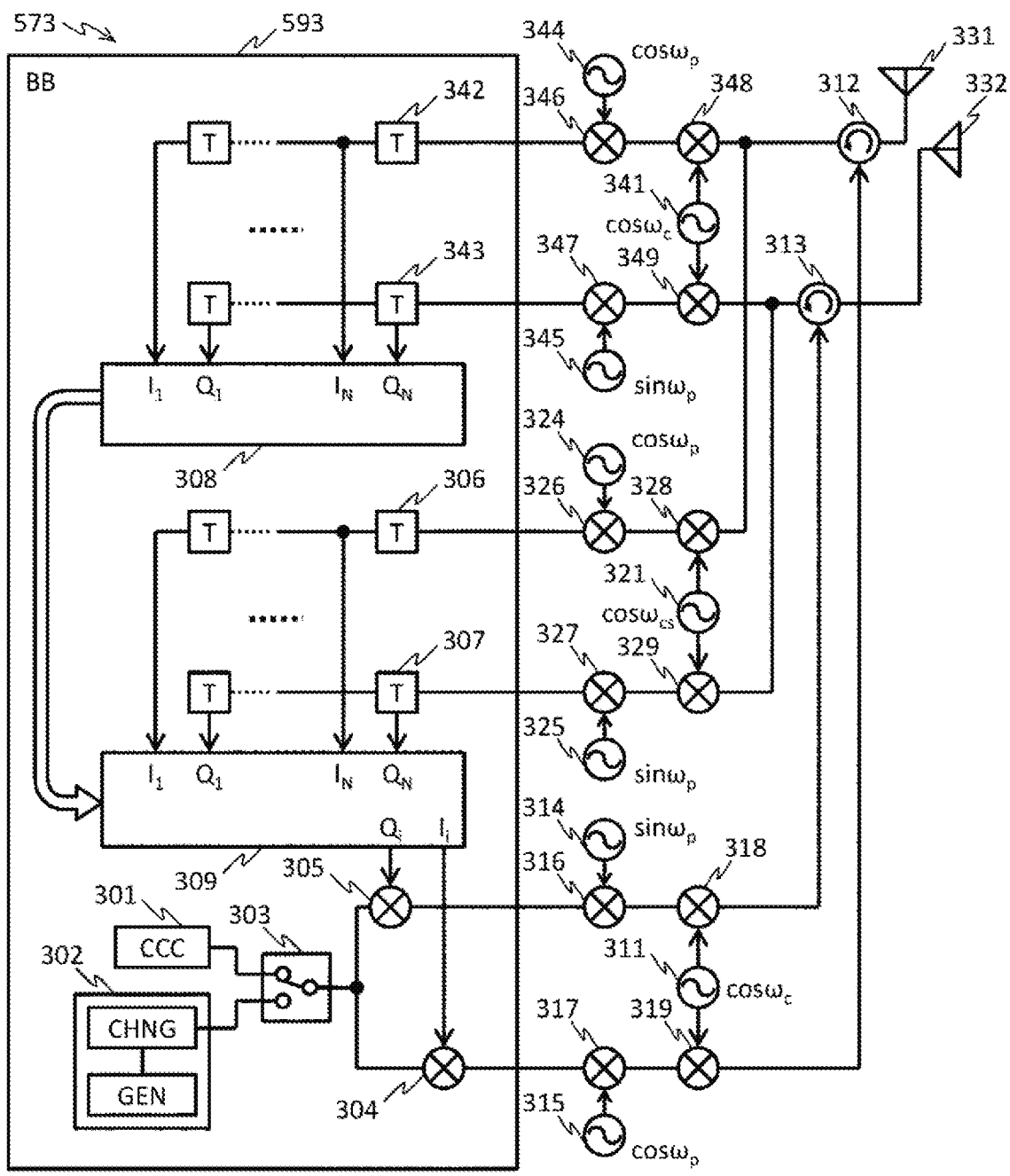
FIG. 13 is a diagram illustrating an example of the wireless device in Embodiment 13.

In the present embodiment, an example of generating a communication channel continuously and corresponding to a change in the communication channel compared to Embodiments 11 and 12 will be described with reference to FIG. 13. FIG. 13 is a diagram illustrating an example of a wireless device 573 of the present embodiment. The wireless device 573 is a wireless device corresponding to the wireless device 572 described with reference to FIG. 12, the same circuit as that in FIG. 12 is denoted by the same reference numeral as that in FIG. 12, and a description thereof will be omitted.

The wireless device 573 illustrated in FIG. 13 is different from the wireless device 572 illustrated in FIG. 12 in that an input of a third carrier reception mixer 348 is newly coupled to the second terminal of the first circulator 312, and an output of a carrier frequency generator 341 is coupled to a local input of the third carrier reception mixer 348.

Another difference is that an input of a third rotationally polarized wave reception mixer 346 is coupled to an output of the third carrier reception mixer 348, and an output of a transmission rotationally polarized wave frequency cosine wave generator 344 is coupled to a local input of the third rotationally polarized wave reception mixer 346.

Another difference is that an input of a fourth carrier reception mixer 349 is newly coupled to the second terminal of the second circulator 313, the output of the carrier frequency generator 341 is coupled to a local input of the fourth carrier reception mixer 349, an input of a fourth rotationally polarized wave reception mixer 347 is coupled to an output of the fourth carrier reception mixer 349, and an output of a transmission rotationally polarized wave frequency sine wave generator 345 is coupled to a local input of the fourth rotationally polarized wave reception mixer 347.

Another difference is that a plurality of second zero phase delay devices 342 are cascade-connected to an output of the third rotationally polarized wave reception mixer 346, outputs of each of the second zero phase delay devices 342 are sequentially branched and input to a second digital arithmetic circuit 308, a plurality of second quadrature phase delay devices 343 are cascade-connected to an output of the fourth rotationally polarized wave reception mixer 347, and outputs of each of the second quadrature phase delay devices 343 are sequentially branched and input to the second digital arithmetic circuit 308.

The channel estimation code generator 301, the data string generator 302, the transmission changeover switch 303, the zero phase multiplier 304, the digital arithmetic circuit 309, the quadrature phase multiplier 305, the zero phase delay device 306, the quadrature phase delay device 307, the second digital arithmetic circuit 308, the second zero phase delay device 342, and the second quadrature phase delay device 343 are formed in a baseband circuit 593. The first antenna 331 and the second antenna 332 may be provided outside the wireless device 573 or inside the wireless device 573.

The second digital arithmetic circuit 308 continuously generates the communication channel by the same process as described in Embodiment 11, and the digital arithmetic circuit 309 illustrated in FIG. 13 performs the same process as the digital arithmetic circuit 309 illustrated in FIG. 12. In the wireless device 573 illustrated in FIG. 13, the digital arithmetic circuit 309 and the second digital arithmetic circuit 308 are coupled with each other to exchange information.

The second digital arithmetic circuit 308 generates the communication channel during the data transmission. When a continuous generation result of the communication channel greatly changes, the wireless device 573 determines that the environment surrounding the wireless device 573 changed and stops the data transmission.

As described above, when the communication channel changes during the data transmission, since the wireless device 573 of a reception side normally is not able to correctly restore the data string transmitted by the other wireless device, it is highly possible that the data string reconstructed from the signal received by the wireless device 573 includes errors.

According to the present embodiment, since such a data string is excludable from the received signal, there is an effect that the reliability of the wireless communication is improved, and since a change in the surrounding environment surrounding the wireless device 573 is detectable, it is possible to improve the efficiency of a maintenance work of a system for preventing function degradation against external factors of the wireless system.

Embodiment 14

Figure 14:
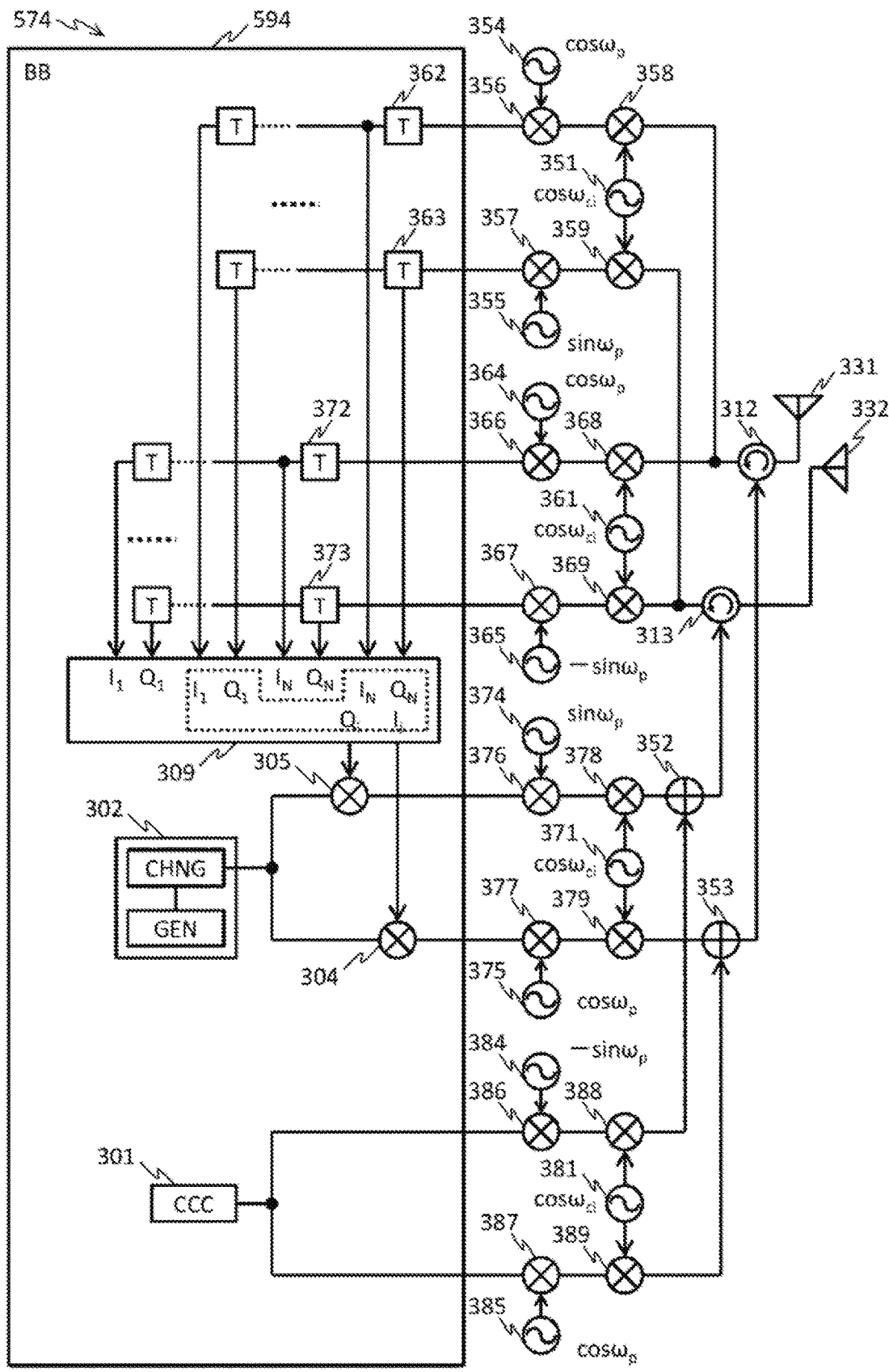
FIG. 14 is a diagram illustrating an example of the wireless device in Embodiment 14.

In the present embodiment, an example in which transmission/reception is possible even when time overlaps due to a left-rotationally polarized wave and a right-rotationally polarized wave and interception by an external person is difficult compared to Embodiments 11 to 13 will be described with reference to FIGS. 14, 23A, 23B, and 26. FIG. 14 is a diagram illustrating an example of a wireless device 574 of the present embodiment, and the wireless device 574 is a wireless device corresponding to the wireless device 573 illustrated in FIG. 13.

The output of the data string generator 302 is branched into two, one is coupled to the input of the quadrature phase multiplier 305 and is coupled to an input of a first rotationally polarized wave transmission mixer 376 after the quadrature phase channel signal output from the digital arithmetic circuit 309 is superimposed, and an output of a transmission left-rotationally polarized wave frequency sine wave generator 374 is coupled to a local input of the first rotationally polarized wave transmission mixer 376.

An input of a first carrier transmission mixer 378 is coupled to an output of the first rotationally polarized wave transmission mixer 376, an output of a carrier frequency generator 371 is coupled to a local input of the first carrier transmission mixer 378, and a first input of a first transmission adder 352 is coupled to an output of the first carrier transmission mixer 378.

The other of the two branches of the output of the data string generator 302 is coupled to the input of the zero phase multiplier 304 and is coupled to an input of a second rotationally polarized wave transmission mixer 377 after the zero phase channel signal output from the digital arithmetic circuit 309 is superimposed, an output of a transmission left-rotationally polarized wave frequency cosine wave generator 375 is coupled to a local input of the second rotationally polarized wave transmission mixer 377.

An input of a second carrier transmission mixer 379 is coupled to an output of the second rotationally polarized wave transmission mixer 377, the output of the carrier frequency generator 371 is coupled to a local input of the second carrier transmission mixer 379, and a first input of a second transmission adder 353 is coupled to an output of the second carrier transmission mixer 379.

The output of the channel estimation code generator 301 is branched into two, one is coupled to an input of a third rotationally polarized wave transmission mixer 386, and an output of a transmission right-rotationally polarized wave frequency sine wave generator 384 is coupled a local input of the third rotationally polarized wave transmission mixer 386.

An input of a third carrier transmission mixer 388 is coupled to an output of the third rotationally polarized wave transmission mixer 386, an output of a carrier frequency generator 381 is coupled to a local input of the third carrier transmission mixer 388, and a second input of the first transmission adder 352 is coupled to an output of the third carrier transmission mixer 388.

The other of the two branches of the output of the channel estimation code generator 301 is coupled to an input of a fourth rotationally polarized wave transmission mixer 387, and an output of a transmission right-rotationally polarized wave frequency cosine wave generator 385 is coupled to a local input of the fourth rotationally polarized wave transmission mixer 387.

An input of a fourth carrier transmission mixer 389 is coupled to an output of the fourth rotationally polarized wave transmission mixer 387, the output of the carrier frequency generator 381 is coupled to a local input of the fourth carrier transmission mixer 389, and a second input of the second transmission adder 353 is coupled to an output of the fourth carrier transmission mixer 389.

An output of the first transmission adder 352 is coupled to the third terminal of the second circulator 313, an output of the second transmission adder 353 is coupled to the third terminal of the first circulator 312, the first antenna 331 is coupled to the first terminal of the first circulator 312, and the second antenna 332 spatially orthogonal to the first antenna 331 is coupled to the first terminal of the second circulator 313.

An output of the second terminal of the first circulator 312 is branched into two, an input of a first carrier reception mixer 358 is coupled to one of the two, an output of a carrier frequency generator 351 is coupled to a local input of the first carrier reception mixer 358, an input of a first rotationally polarized wave reception mixer 356 is coupled to an output of the first carrier reception mixer 358, and an output of a reception left-rotationally polarized wave frequency cosine wave generator 354 is coupled to a local input of the first rotationally polarized wave reception mixer 356.

An input of a third carrier reception mixer 368 is coupled to the other of the two branches of the output of the second terminal of the first circulator 312, an output of a carrier frequency generator 361 is connected to a local input of the third carrier reception mixer 368, an input of a third rotationally polarized wave reception mixer 366 is coupled to an output of the third carrier reception mixer 368, and an output of a reception right-rotationally polarized wave frequency cosine wave generator 364 is coupled to a local input of the third rotationally polarized wave reception mixer 366.

An output of the second terminal of the second circulator 313 is branched into two, an input of a second carrier reception mixer 359 is coupled to one of the two, the output of the carrier frequency generator 351 is coupled to a local input of the second carrier reception mixer 359, an input of a second rotationally polarized wave reception mixer 357 is coupled to an output of the second carrier wave reception mixer 359, and an output of a reception left-rotationally polarized wave frequency sine wave generator 355 is coupled a local input of the second rotationally polarized wave reception mixer 357.

An input of a fourth carrier reception mixer 369 is coupled to the other of the two branches of the output of the second terminal of the second circulator 313, the output of the carrier frequency generator 361 is connected to a local input of the fourth carrier reception mixer 369, an input of a fourth rotationally polarized wave reception mixer 367 is coupled to an output of the fourth carrier reception mixer 369, and an output of a reception right-rotationally polarized wave frequency sine wave generator 365 is coupled to a local input of the fourth rotationally polarized wave reception mixer 367.

A plurality of zero phase delay devices 362 are cascade-connected to an output of the first rotationally polarized wave reception mixer 356, outputs of each of the zero phase delay devices 362 are sequentially branched and input to the digital arithmetic circuit 309, a plurality of quadrature phase delay devices 363 are cascade-connected to an output of the second rotationally polarized wave reception mixer 357, and outputs of each of the quadrature phase delay devices 363 are sequentially branched and input to the digital arithmetic circuit 309.

A plurality of second zero phase delay devices 372 are cascade-connected to an output of the third rotationally polarized wave reception mixer 366, outputs of each of the second zero phase delay devices 372 are sequentially branched and input to the digital arithmetic circuit 309, a plurality of second quadrature phase delay devices 373 are cascade-connected to an output of the fourth rotationally polarized wave reception mixer 367, and outputs of each of the second quadrature phase delay devices 373 are sequentially branched and input to the digital arithmetic circuit 309.

The channel estimation code generator 301, the data string generator 302, the zero phase multiplier 304, the digital arithmetic circuit 309, the quadrature phase multiplier 305, the zero phase delay device 362, the quadrature phase delay device 363, the second zero phase delay device 372, and the second quadrature phase delay device 373 are formed in a baseband circuit 594. The first antenna 331 and the second antenna 332 may be provided outside the wireless device 574 or inside the wireless device 574.

Figure 26:
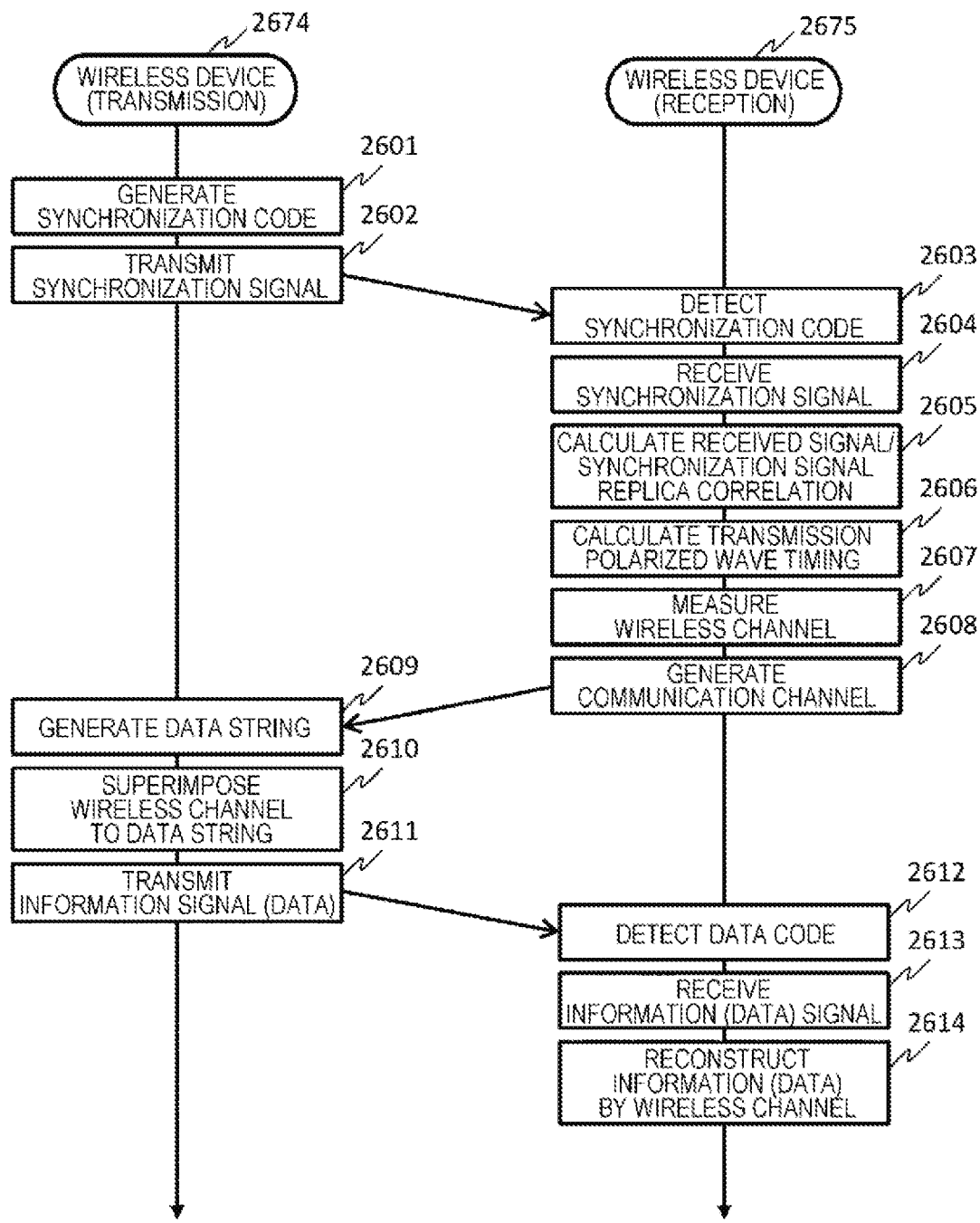
FIG. 26 is a diagram illustrating an example of the communication procedure of the wireless system in Embodiment 14.

A communication procedure of the wireless system of the present embodiment will be described with reference to FIG. 26. In the example of FIG. 26, the wireless device that performs transmission is set as a wireless device 2674, and the wireless device that performs reception is set as a wireless device 2675. Both of a structure of the wireless device 2674 and a structure of the wireless device 2675 are the same as those of the wireless device 574.

The wireless device 2674 outputs the synchronization code by the channel estimation code generator 301 (step 2601), branches the output thereof into two, and inputs the two branches to the third rotationally polarized wave transmission mixer 386 and the fourth rotationally polarized wave transmission mixer 387.

The outputs of the transmission right-rotationally polarized wave frequency sine wave generator 384 and the transmission right-rotationally polarized wave frequency cosine wave generator 385 are superimposed to the synchronization code by each mixer, and the synchronization code advances the circuit as described with reference to FIG. 14 and is radiated to space by the rotationally polarized wave of a right rotation by the first antenna 331 and the second antenna 332 spatially orthogonal to each other (step 2602).

The wireless device 2675 receives a signal transmitted from the wireless device 2674 (step 2604). Note that the detection of the synchronization code (step 2603) is as described with reference to FIG. 24. Hereinafter, an operation of a circuit in the wireless device 2675 will also be described using the reference numerals of the wireless device 574 of the same structure.

The received signal of the first antenna 331 of the wireless device 2675 is branched into two and is down-converted by the outputs of the carrier frequency generator 351 and the carrier frequency generator 361 by the first carrier reception mixer 358 and the third carrier reception mixer 368. The received signal of the second antenna 332 is branched into two and is down-converted by the outputs of the carrier frequency generator 351 and the carrier frequency generator 361 by the second carrier reception mixer 359 and the fourth carrier reception mixer 369.

The wireless device 2675 inputs one set of two sets of the down-converted received signals obtained from different antennas to first rotationally polarized wave reception mixer 356 and second rotationally polarized wave reception mixer 357, and obtains baseband signals of zero phase and quadrature phase regarding the left-rotationally polarized wave using the outputs of the reception left-rotationally polarized wave frequency cosine wave generator 354 and the reception left-rotationally polarized wave frequency sine wave generator 355.

The wireless device 2675 inputs the other set of the two sets of the down-converted received signals obtained from different antennas to the third rotationally polarized wave reception mixer 366 and the fourth rotationally polarized wave reception mixer 367, and obtains the baseband signals of zero phase and quadrature phase regarding the right-rotationally polarized wave using the outputs of the reception right-rotationally polarized wave frequency cosine wave generator 364 and the reception right-rotationally polarized wave frequency sine wave generator 365.

Since an origin of the obtained two sets of baseband signals is signals transmitted by the right-rotationally polarized wave and the left-rotationally polarized wave, even when the time overlaps similarly to Embodiment 13, baseband signals are independently processed by the digital arithmetic circuit 309.

Therefore, when the synchronization code of the right-rotationally polarized wave is detected (step 2603), the digital arithmetic circuit 309 performs sliding correlation calculation using the received signal and the synchronization code replica (step 2605), detects transmission timing of the wireless device 2674 (step 2606), and establishes synchronization with the wireless device 2674.

After establishing the synchronization, strength and phase of the baseband signals of both phases are measured (step 2607), and a communication channel is generated (step 2608) and is transmitted to the wireless device 2674. The wireless device 2674 receives the generation of the communication channel by the wireless device 2675, generates the data string to be transmitted by the data string generator 302 (step 2609), in the same procedure as in Embodiment 11, pairs the data string with the obtained communication channel (step 2610), and transmits the electromagnetic wave of the left-rotationally polarized wave (step 2611).

The wireless device 2675 receives the signal transmitted by the wireless device 2674 (step 2613). Here, the received signal is a signal including the data string as information, special data transmitted at beginning of the transmission of the data string, that is, special data shared by the wireless device 2674 and the wireless device 2675 in advance is detected (step 2612), and a start of an arrival of the data string is detected.

Upon starting reception of the signal including the data string, the wireless device 2675 receives and accumulates the signal including the data string for several periods of the left-rotationally polarized wave and reconstructs the information of the data string from the received signal using the obtained communication channel (step 2614).

In the description with reference to FIG. 26, the example in which the synchronization code and the data string are sequentially transmitted by time has been described, but as it is apparent from the example of the wireless device 574 illustrated in FIG. 14, in the present embodiment, the signal including the data string and the signal including the synchronization code for generating the communication channel are able to be independently transmitted even when the time overlaps.

Figure 23A:
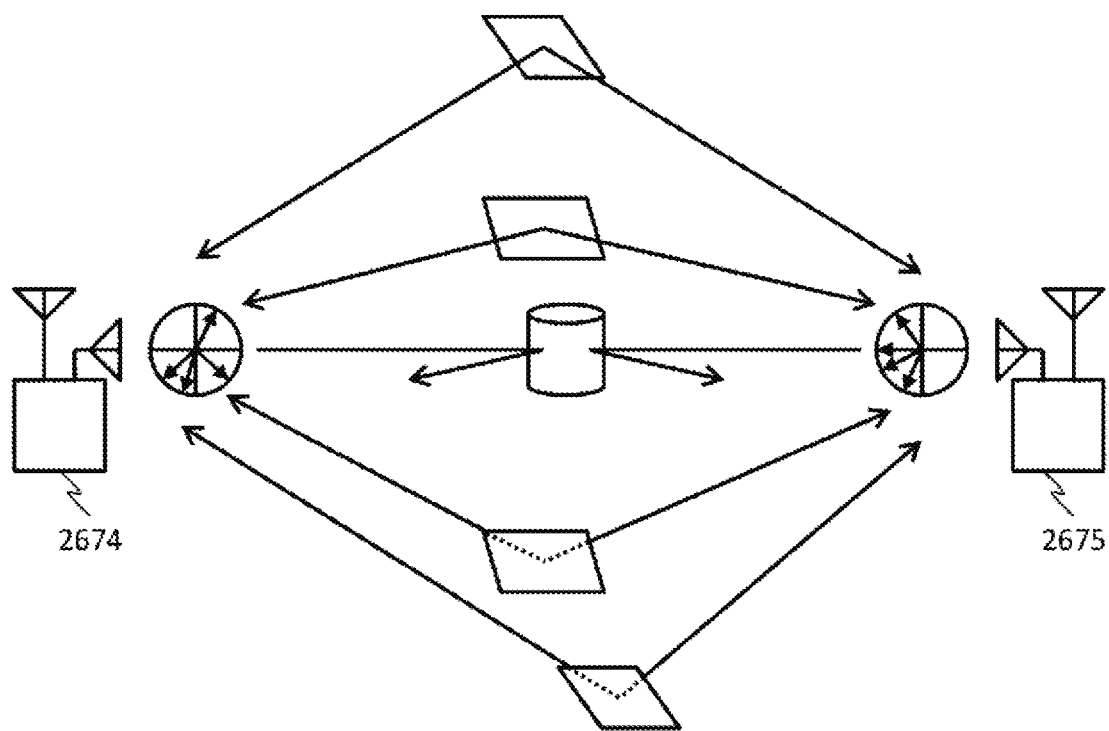
FIG. 23A is a diagram illustrating an example of the wireless environment in Embodiment 14.
Figure 23B:
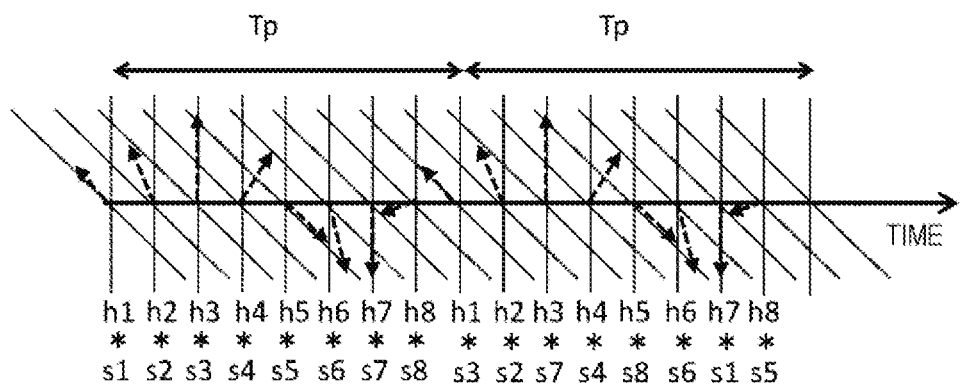
FIG. 23B is a diagram illustrating an example of the communication channel in Embodiment 14.

Another example of communication between the wireless device 2674 and the wireless device 2675 in the present embodiment is illustrated in FIG. 23A. For example, the data string may be transmitted from the wireless device 2675 to the wireless device 2674 during the transmission of the synchronization code from the wireless device 2674 to the wireless device 2675. An example of pairing of the communication channel of different timing within one period of the rotationally polarized wave and a series of data strings output from the data string generator 302 in the present embodiment is illustrated in FIG. 23B.

According to the present embodiment, in wireless transmission of information that makes it impossible to reconstruct data to be transmitted by an external person, since a ratio of time for transmitting information to be transmitted within a time required for the wireless communication is greatly increased, there is an effect that a data transmission efficiency of the wireless system is improved.

Embodiment 15

Figure 27:
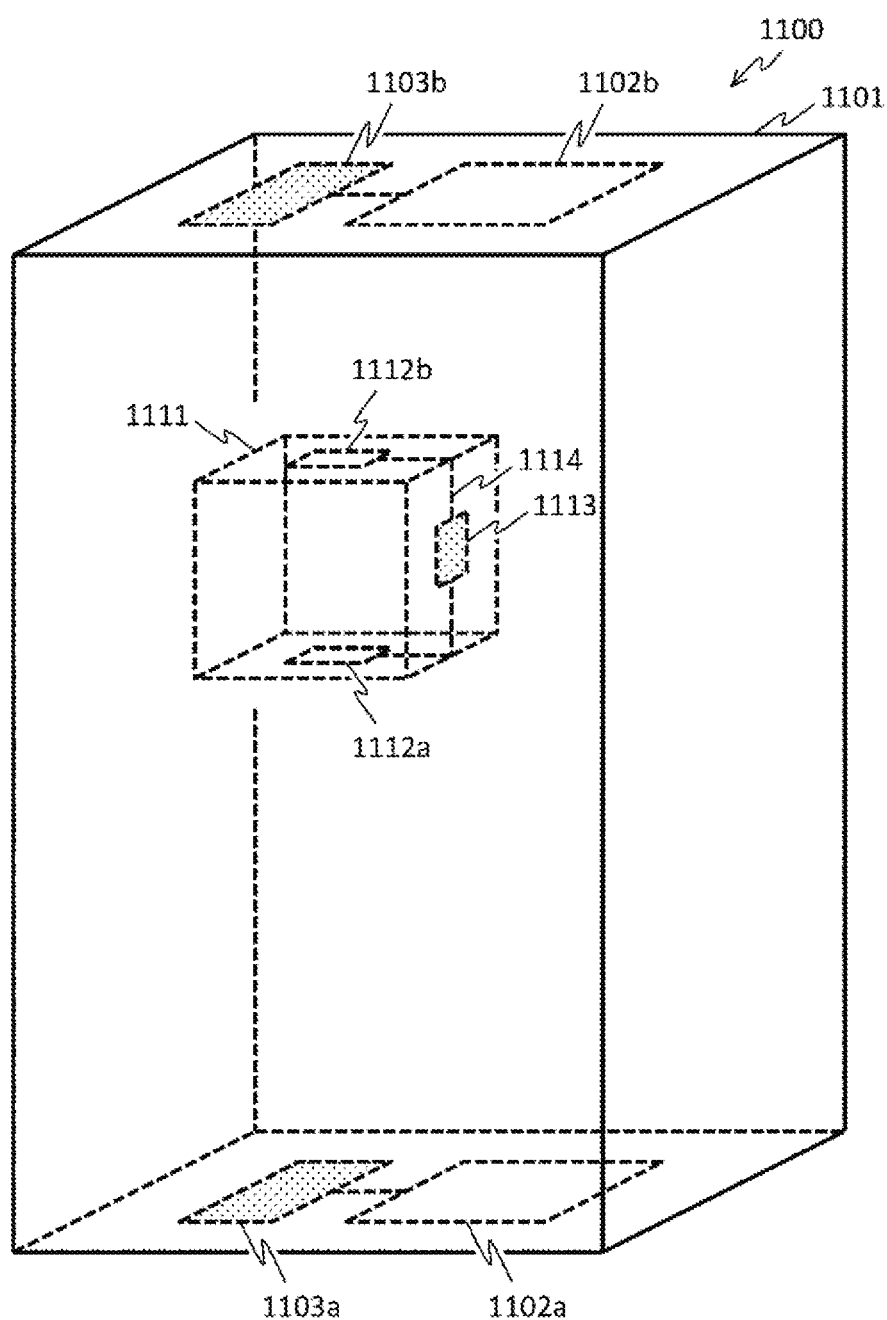
FIG. 27 is a diagram illustrating an example of an elevator surveillance and control system in Embodiment 15.

In the present embodiment, an example in which the wireless devices of Embodiments 1 to 14 are applied to an elevator surveillance and control system will be described. FIG. 27 is a diagram illustrating an example of the elevator surveillance and control system of the present embodiment. In the elevator surveillance and control system 1100 of the present embodiment, an elevator car 1111 moves up and down inside a building 1101 where an elevator is installed. In the example of FIG. 27, there is one elevator car 1111, but a plurality of elevator cars 1111 may be provided.

Base station rotationally polarized wave wireless devices 1103a and 1103b and base station dual cross polarized wave integrated antennas 1102a and 1102b are coupled and installed on a floor portion and a ceiling portion in the building 1101, respectively. Terminal station dual cross polarized wave integrated antennas 1112a and 1112b are installed on an external ceiling portion and an external floor portion of the elevator car 1111 respectively and are coupled to a wireless terminal 1113 by using a high frequency cable 1114.

Since wireless communication between the base station rotationally polarized wave wireless devices 1103a and 1103b and the wireless terminal 1113 uses an inside of the building 1101 as a wireless transmission medium, an electromagnetic wave receives multiple reflection by an inner wall of the building 1101 and an outer wall of the elevator car 1111, and when the polarized waves of the plurality of electromagnetic waves transmitted by the wireless terminal 1113 reach the base station rotationally polarized wave wireless devices 1103a and 1103b, the polarized waves are not always the same.

Since the elevator car 1111 changes the position by ascending and descending, when the base station rotationally polarized wave wireless devices 1103a and 1103b and the wireless terminal 1113 wirelessly communicate with each other during stop of the elevator car 1111, there is a possibility that the polarized wave of the electromagnetic waves reaching from the wireless terminal 1113 to base station rotationally polarized wave wireless devices 1103*a* and 1103*b* may change every stop.

Here, each of the terminal station dual cross polarized wave integrated antennas 1112*a* and 1112*b* and the wireless terminal 1113 are set as, for example, the first antenna 31, the second antenna 32, and the wireless device 101 described with reference to FIG. 1, and each of the base station rotationally polarized wave wireless devices 1103*a* and 1103*b* is set as the wireless device 201 described with reference to FIG. 1. The wireless terminal 1113 and each of the base station rotationally polarized wave wireless devices 1103*a* and 1103*b* may be set to the wireless device of any of Embodiments 2 to 14.

According to the present embodiment as described above, by performing the transmission of the synchronization code and the data string within the time during which the elevator car 1111 stops and relative positions of the base station rotationally polarized wave wireless devices 1103*a* and 1103*b* and the wireless terminal 1113 are fixed, it is possible to perform highly reliable wireless communication between the base station rotationally polarized wave wireless devices 1103*a* and 1103*b* and the wireless terminal 1113 in the elevator where it is difficult to predict the relative fixed position.

Since the control and surveillance of the elevator car 1111 is implemented without using a wired connection from the building 1101, a cable or the like for the wired connection becomes unnecessary. Therefore, since it is unnecessary to secure space for a cable or the like, same transportation capacity can be realized with a smaller building volume or the transportation capacity can be improved by increasing size of the elevator with same building volume.

Embodiment 16

Figure 28:
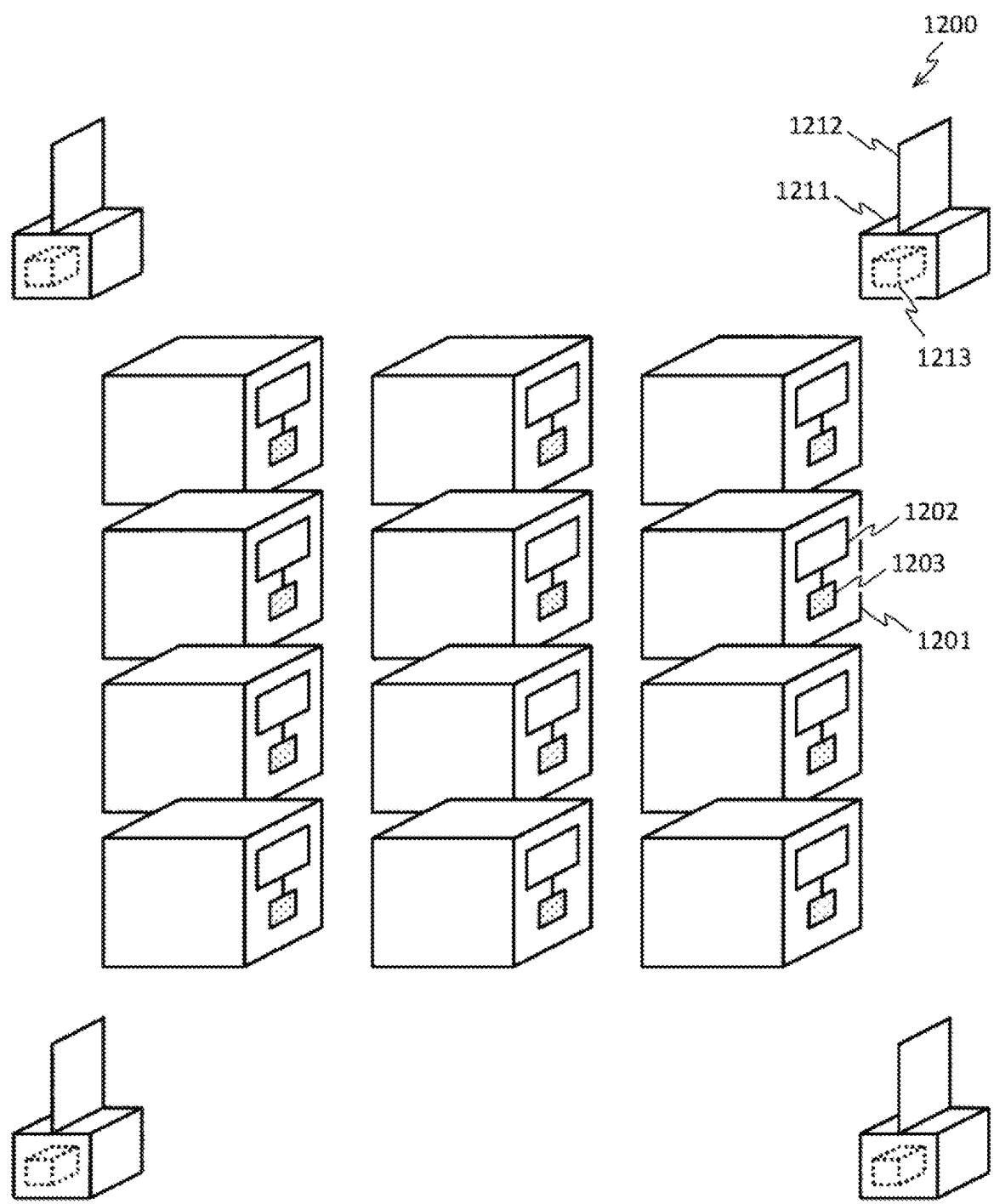
FIG. 28 is a diagram illustrating an example of a substation equipment surveillance and control system in Embodiment 16.

In the present embodiment, an example in which the wireless devices of Embodiments 1 to 14 are applied to a substation equipment surveillance and control system will be described. FIG. 28 is a diagram illustrating an example of a substation equipment surveillance and control system of the present embodiment. The substation equipment surveillance and control system 1200 of the present embodiment includes a plurality of substation machines 1201.

A wireless terminal 1203 and a wireless terminal dual cross polarized wave integrated antenna 1202 are coupled and installed in the substation machine 1201. A wireless base station 1211 is set up in the vicinity of the plurality of substation machines 1201, and the wireless base station 1211 is installed by coupling a rotationally polarized wave wireless device 1213 and a rotationally polarized wave wireless device dual cross polarized wave integrated antenna 1212 with each other.

The substation machine 1201 has dimensions of several m (meter), and is overwhelmingly larger than a wavelength corresponding to several-hundred MHz (megahertz) to several GHz (gigahertz), which is a frequency of an electromagnetic wave radiated from the wireless terminal dual cross polarized wave integrated antenna 1202 and the rotationally polarized wave wireless device dual cross polarized wave integrated antenna 1212.

Therefore, the electromagnetic wave is multi-reflected by the plurality of substation machines 1201 and a multi-wave interference environment is formed. A plurality of electromagnetic waves radiated from the wireless terminal dual cross polarized wave integrated antenna 1202 of the wireless terminal 1203 fixedly installed on each substation machine 1201 reaches the rotationally polarized wave wireless device dual cross polarized wave integrated antenna 1212 installed on the wireless base station 1211 with different polarized waves.

Therefore, each of a plurality of wireless terminals dual cross polarized wave integrated antenna 1202 and the wireless terminal 1203 is set, for example, as the first antenna 31, the second antenna 32, and the wireless device 101 described with reference to FIG. 1, and each of a plurality of rotationally polarized wave wireless device 1213 is set to the wireless device 201 described with reference to FIG. 1. Each of the wireless terminal 1203 and the rotationally polarized wave wireless device 1213 may be set to the wireless device of any of Embodiments 2 to 14.

According to the present embodiment as described above, since it is possible to perform highly reliable wireless communication between the plurality of rotationally polarized wave wireless devices 1213 and the plurality of wireless terminals 1203, it is possible to implement control and surveillance of the substation machine 1201 from the wireless base station 1211 using wireless communication without using wired connection.

Therefore, since a problem of high voltage inductive power, which is a problem when a cable or the like for wired connection is used, is solved and laying cost of the cable or the like is eliminated, there are effects in improving safety of a substation equipment surveillance and control system and reducing cost.

The embodiment for implementing the present invention is not limited to each of Embodiments described above. For example, a part of one embodiment may be added to another embodiment, and a part of one embodiment may be replaced with a part of another embodiment.

What is claimed is:

1. A wireless communication system that communicates by an electromagnetic wave, the wireless communication system comprising:
    a first wireless device that includes a transmission rotationally polarized wave frequency generator for giving a rotation period to a polarized wave of the electromagnetic wave to be transmitted, transmits a synchronization code by the electromagnetic wave of the polarized wave rotated using the transmission rotationally polarized wave frequency generator, and transmits data by the electromagnetic wave of the polarized wave rotated using the transmission rotationally polarized wave frequency generator; and
    a second wireless device that includes a reception rotationally polarized wave frequency generator for giving a rotation period to the polarized wave received in a reception of the electromagnetic wave, calculates transmission timing of the synchronization code included in the received electromagnetic wave of the polarized wave rotated using the reception rotationally polarized wave frequency generator, and sets a signal included in the received electromagnetic wave of the polarized wave rotated using the reception rotationally polarized wave frequency generator as data based on the calculated transmission timing.

2. The wireless communication system according to claim 1, wherein
    the first wireless device alternately transmits a signal of the synchronization code including a frequency component higher than a frequency of the rotationally polarized wave to detect each time within the rotation period given by the transmission rotationally polarized wave frequency generator and a signal of data including a frequency component lower than the frequency of the rotationally polarized wave to detect each time within the rotation period given by the transmission rotationally polarized wave frequency generator.

3. The wireless communication system according to claim 2, wherein
the second wireless device calculates the transmission timing by sliding correlation between a signal of the synchronization code included in the received electromagnetic wave of the polarized wave rotated using the reception rotationally polarized wave frequency generator and a replica signal of the synchronization code.

4. The wireless communication system according to claim 1, wherein
the first wireless device transmits a signal of the synchronization code including a frequency component higher than a frequency of the rotationally polarized wave to detect each time within the rotation period given by the transmission rotationally polarized wave frequency generator, and sequentially transmits a plurality of signals of data including a frequency component lower than the frequency of the rotationally polarized wave to detect each time within the rotation period given by the transmission rotationally polarized wave frequency generator after transmitting the signal of the synchronization code.

5. The wireless communication system according to claim 2, wherein
the wireless communication system includes a plurality of the first wireless devices,
a third wireless device among the plurality of first wireless devices further includes a transmission carrier variable frequency generator that enables selection of a frequency of a carrier for transmitting the electromagnetic wave, and transmits an identification number of the third wireless device, the synchronization code, and data by the electromagnetic wave of the polarized wave that is rotated using the transmission rotationally polarized wave frequency generator and up-converted by the carrier of a first frequency selected in the transmission carrier variable frequency generator, and
a fourth wireless device among the plurality of first wireless devices further includes a reception rotationally polarized wave frequency generator for giving a rotation period to the polarized wave received in the reception of the electromagnetic wave, a reception carrier variable frequency generator that enables selection of a frequency of a carrier for receiving the electromagnetic wave, and a transmission carrier variable frequency generator that enables selection of a frequency of the carrier for transmitting the electromagnetic wave, detects the identification number of the third wireless device included in the received electromagnetic wave of the polarized wave that is rotated using the reception rotationally polarized wave frequency generator of the fourth wireless device and down-converted by the carrier of the first frequency selected in the reception carrier variable frequency generator of the fourth wireless device, and selects a second frequency in the transmission carrier variable frequency generator of the fourth wireless device.

6. The wireless communication system according to claim 2, wherein
the wireless communication system includes a plurality of the first wireless devices,
a third wireless device among the plurality of first wireless devices further includes a transmission carrier variable frequency generator that enables selection of a frequency of a carrier for transmitting the electromagnetic wave, and transmits a first orthogonal synchronization code and data by the electromagnetic wave of the polarized wave that is rotated using the transmission rotationally polarized wave frequency generator and up-converted by the carrier of a first frequency selected in the transmission carrier variable frequency generator,
a fourth wireless device among the plurality of first wireless devices further includes a transmission carrier variable frequency generator that enables selection of the frequency of the carrier for transmitting the electromagnetic wave, and transmits a second orthogonal synchronization code and data by the electromagnetic wave of the polarized wave that is rotated using the transmission rotationally polarized wave frequency generator and up-converted by the carrier of a second frequency selected in the transmission carrier variable frequency generator of the fourth wireless device.

7. The wireless communication system according to claim 2, wherein
the first wireless device further includes a transmission carrier fixed frequency generator of which a frequency of a carrier for transmitting the electromagnetic wave is fixed and a transmission carrier variable frequency generator that enables selection of the frequency of the carrier for transmitting the electromagnetic waves, transmits the synchronization code by the electromagnetic wave of the polarized wave that is rotated using the transmission rotationally polarized wave frequency generator and up-converted by the carrier of the transmission carrier fixed frequency generator, and transmits data by the electromagnetic wave of the polarized wave that is rotated using the transmission rotationally polarized wave frequency generator and up-converted by the carrier of a first frequency selected in the transmission carrier variable frequency generator, and
the second wireless device further includes a reception carrier fixed frequency generator of which a frequency of a carrier for receiving the electromagnetic wave is fixed and a reception carrier variable frequency generator that enables selection of the frequency of the carrier for receiving the electromagnetic waves, calculates the transmission timing of the synchronization code included in the received electromagnetic wave of the polarized wave that is rotated using the reception rotationally polarized wave frequency generator and down-converted by the carrier of the reception carrier fixed frequency generator, and sets the signal included in the received electromagnetic wave of the polarized wave that is rotated using the reception rotationally polarized wave frequency generator and down-converted by the carrier of the frequency selected in the reception carrier variable frequency generator, as data based on the calculated transmission timing.

8. The wireless communication system according to claim 7, wherein
the transmission carrier fixed frequency generator and the reception carrier fixed frequency generator stop for a time set in advance.

9. The wireless communication system according to claim 2, wherein the wireless communication system includes a plurality of the first wireless devices and a plurality of the second wireless devices, a third wireless device among the plurality of first wireless devices further includes a first transmission carrier variable frequency generator and a second transmission carrier variable frequency generator that enable selection of a frequency of a carrier for transmitting the electromagnetic wave, and a first transmission rotationally polarized wave frequency generator and a second transmission rotationally polarized wave frequency generator as the transmission rotationally polarized wave frequency generator, transmits a first orthogonal synchronization code by the electromagnetic wave of the polarized wave that is rotated in a first direction using the first transmission rotationally polarized wave frequency generator and up-converted by the carrier of a first frequency selected in the first transmission carrier variable frequency generator, and transmits data by the electromagnetic wave of the polarized wave that is rotated in a second direction using the second transmission rotationally polarized wave frequency generator and up-converted by the carrier of the first frequency selected in the second transmission carrier variable frequency generator, a fourth wireless device among the plurality of first wireless devices further includes a third transmission carrier variable frequency generator and a fourth transmission carrier variable frequency generator that each enable selection of the frequency of the carrier for transmitting the electromagnetic wave, and a third transmission rotationally polarized wave frequency generator and a fourth transmission rotationally polarized wave frequency generator as the transmission rotationally polarized wave frequency generator, transmits a second orthogonal synchronization code by the electromagnetic wave of the polarized wave that is rotated in the first direction using the third transmission rotationally polarized wave frequency generator and up-converted by the carrier of a second frequency selected in the third transmission carrier variable frequency generator, and transmits data by the electromagnetic wave of the polarized wave that is rotated in the second direction using the fourth transmission rotationally polarized wave frequency generator and up-converted by the carrier of the second frequency selected in the fourth transmission carrier variable frequency generator, a fifth wireless device among the plurality of second wireless devices further includes a first reception carrier variable frequency generator and a second reception carrier variable frequency generator that enable selection of a frequency of a carrier for receiving the electromagnetic wave, and a first reception rotationally polarized wave frequency generator and a second reception rotationally polarized wave frequency generator as the reception rotationally polarized wave frequency generator, calculates the transmission timing of the first orthogonal synchronization code included in the received electromagnetic wave of the polarized wave that is rotated in the first direction using the first reception rotationally polarized wave frequency generator and down-converted by the carrier of the first frequency selected in the first reception carrier variable frequency generator, and sets a signal included in the received electromagnetic wave of the polarized wave rotated in the second direction using the second reception rotationally polarized wave frequency generator, that is down-converted by the carrier of the first frequency selected in the second reception carrier variable frequency generator, as data based on the calculated transmission timing of the first orthogonal synchronization code, and a sixth wireless device among the plurality of second wireless devices further includes a third reception carrier variable frequency generator and a fourth reception carrier variable frequency generator that enable selection of the frequency of the carrier for receiving the electromagnetic wave, and a third reception rotationally polarized wave frequency generator and a fourth reception rotationally polarized wave frequency generator as the reception rotationally polarized wave frequency generator, calculates the transmission timing of the second orthogonal synchronization code included in the received electromagnetic wave of the polarized wave that is rotated in the first direction using the third reception rotationally polarized wave frequency generator and down-converted by the carrier of the second frequency selected in the third reception carrier variable frequency generator, and sets a signal included in the received electromagnetic wave of the polarized wave that is rotated in the second direction using the fourth reception rotationally polarized wave frequency generator and down-converted by the carrier of the second frequency selected in the fourth reception carrier variable frequency generator, as data based on the calculated transmission timing of the second orthogonal synchronization code.

10. The wireless communication system according to claim 9, wherein the first transmission carrier variable frequency generator, the third transmission carrier variable frequency generator, the first reception carrier variable frequency generator, and the third reception carrier variable frequency generator stop for a time set in advance.

11. The wireless communication system according to claim 1, wherein the first wireless device further includes a first antenna, a second antenna, and a transmission rotationally polarized wave frequency cosine wave generator and a transmission rotationally polarized wave frequency sine wave generator as the transmission rotationally polarized wave frequency generator, branches the signal of the synchronization code into two, superimposes a zero phase channel signal on one side, mixes a cosine wave to the superimposed signal using the transmission rotationally polarized wave frequency cosine wave generator, transmits the mixed signal as the electromagnetic wave from the first antenna, superimposes a quadrature phase channel signal on the other side, mixes a sine wave to the superimposed signal using the transmission rotationally polarized wave frequency sine wave generator, transmits the mixed signal as the electromagnetic wave from the second antenna, branches a signal obtained by exchanging a bit string of data into two according to a rule set in advance, superimposes the zero phase channel signal on one side, mixes the cosine wave to the superimposed signal using the transmission rotationally polarized wave frequency cosine wave generator, transmits the mixed signal as the electromagnetic wave from the first antenna, superimposes the quadrature phase channel signal on the other side, mixes the sine wave to the superimposed signal using the transmission rotationally polarized wave frequency sine wave generator, and transmits the mixed signal as the electromagnetic wave from the second antenna, and the second wireless device further includes a third antenna, a fourth antenna, and a reception rotationally polarized wave frequency cosine wave generator and a reception rotationally polarized wave frequency sine wave generator as the reception rotationally polarized wave frequency generator, mixes the cosine wave to a signal included in the electromagnetic wave received by the third antenna using the reception rotationally polarized wave frequency cosine wave generator to obtain a zero phase received signal, mixes the sine wave to the signal included in the electromagnetic wave received by the fourth antenna using the reception rotationally polarized wave frequency sine wave generator to obtain a quadrature phase received signal, calculates the transmission timing of the synchronization code included in the zero phase received signal and the quadrature phase received signal, and reconstructs data from a signal included in the zero phase received signal and the quadrature phase received signal based on the calculated transmission timing and the rule set in advance.

12. The wireless communication system according to claim 11, wherein the second wireless device further includes a first reception rotationally polarized wave frequency cosine wave generator and a second reception rotationally polarized wave frequency cosine wave generator as the reception rotationally polarized wave frequency cosine wave generator, and a first reception rotationally polarized wave frequency sine wave generator and a second reception rotationally polarized wave frequency sine wave generator as the reception rotationally polarized wave frequency sine wave generator, mixes the cosine wave to the signal included in the electromagnetic wave received by the third antenna using the first reception rotationally polarized wave frequency cosine wave generator to obtain a first zero phase received signal, mixes the cosine wave to the signal included in the electromagnetic wave received by the third antenna using the second reception rotationally polarized wave frequency cosine wave generator to obtain a second zero phase received signal, mixes the sine wave to the signal included in the electromagnetic wave received by the fourth antenna using the first reception rotationally polarized wave frequency sine wave generator to obtain a first quadrature phase received signal, mixes the sine wave to the signal included in the electromagnetic wave received by the fourth antenna using the second reception rotationally polarized wave frequency sine wave generator to obtain a second quadrature phase received signal, calculates the transmission timing of the synchronization code included in the first zero phase received signal and the first quadrature phase received signal, and reconstructs data from a signal included in the second zero phase received signal and the second quadrature phase received signal based on the calculated transmission timing and the rule set in advance.

13. The wireless communication system according to claim 11, wherein the first wireless device further includes the first antenna, the second antenna, and a first transmission rotationally polarized wave frequency cosine wave generator, a second transmission rotationally polarized wave frequency cosine wave generator, a first transmission rotationally polarized wave frequency sine wave generator, and a second transmission rotationally polarized wave frequency sine wave generator as the transmission rotationally polarized wave frequency generator, branches the signal of the synchronization code into two, mixes the cosine wave for right rotation using the first transmission rotationally polarized wave frequency cosine wave generator on one side, transmits the mixed signal as the electromagnetic wave from the first antenna, mixes the sine wave for right rotation using the first transmission rotationally polarized wave frequency sine wave generator on the other side, transmits the mixed signal as the electromagnetic wave from the second antenna, branches the signal obtained by exchanging the bit string of data into two according to the rule set in advance, superimposes the zero phase channel signal on one side, mixes the cosine wave for left rotation to the superimposed signal using the second transmission rotationally polarized wave frequency cosine wave generator, transmits the mixed signal as the electromagnetic wave from the first antenna, superimposes the quadrature phase channel signal on the other side, mixes the sine wave for left rotation to the superimposed signal using the second transmission rotationally polarized wave frequency sine wave generator, and transmits the mixed signal as the electromagnetic wave from the second antenna, and the second wireless device further includes the third antenna, the fourth antenna, and a first reception rotationally polarized wave frequency cosine wave generator, a second reception rotationally polarized wave frequency cosine wave generator, a first reception rotationally polarized wave frequency sine wave generator, and a second reception rotationally polarized wave frequency sine wave generator as the reception rotationally polarized wave frequency generator, mixes the cosine wave to the signal included in the electromagnetic wave received by the third antenna using the first reception rotationally polarized wave frequency cosine wave generator to obtain a first zero phase received signal, mixes the cosine wave to the signal included in the electromagnetic wave received by the third antenna using the second reception rotationally polarized wave frequency cosine wave generator to obtain a second zero phase received signal, mixes the sine wave to the signal included in the electromagnetic wave received by the fourth antenna using the first reception rotationally polarized wave frequency sine wave generator to obtain a first quadrature phase received signal, mixes the sine wave to the signal included in the electromagnetic wave received by the fourth antenna using the first reception rotationally polarized wave frequency sine wave generator to obtain a second quadrature phase received signal, calculates the transmission timing of the synchronization code included in the first zero phase received signal and the first quadrature phase received signal, and reconstructs data from a signal included in the second zero phase received signal and the second quadrature phase received signal based on the calculated transmission timing and the rule set in advance.

14. A wireless surveillance control system of an elevator in which an elevator car moves in a building, wherein an outer surface of the elevator car is provided with a slave station that includes a transmission rotationally polarized wave frequency generator for giving a rotation period to a polarized wave of an electromagnetic wave to be transmitted, transmits a synchronization code by the electromagnetic wave of the polarized wave rotated using the transmission rotationally polarized wave frequency generator, and transmits data for surveillance control by the electromagnetic wave of the polarized wave rotated using the transmission rotationally polarized wave frequency generator, and an inner surface of the building is provided with a master station that includes a reception rotationally polarized wave frequency generator for giving a rotation period to the polarized wave received in a reception of the electromagnetic wave, calculates transmission timing of the synchronization code included in the received electromagnetic wave of the polarized wave rotated using the reception rotationally polarized wave frequency generator, and sets a signal included in the received electromagnetic wave of the polarized wave rotated using the reception rotationally polarized wave frequency generator as data for the surveillance control based on the calculated transmission timing.

15. A wireless surveillance control system of a plurality of substation machines by a plurality of base stations, wherein
each of the plurality of substation machines includes a slave station that includes a transmission rotationally polarized wave frequency generator for giving a rotation period to a polarized wave of an electromagnetic wave to be transmitted, transmits a synchronization code by the electromagnetic wave of the polarized wave rotated using the transmission rotationally polarized wave frequency generator, and transmits data for surveillance control by the electromagnetic wave of the polarized wave rotated using the transmission rotationally polarized wave frequency generator, and each of the plurality of base stations includes a master station that includes a reception rotationally polarized wave frequency generator for giving a rotation period to the polarized wave received in a reception of the electromagnetic wave, calculates transmission timing of the synchronization code included in the received electromagnetic wave of the polarized wave rotated using the reception rotationally polarized wave frequency generator, and sets a signal included in the received electromagnetic wave of the polarized wave rotated using the reception rotationally polarized wave frequency generator, as data for the surveillance control, based on the calculated transmission timing.

* * * * *